US012809063B2

United States Patent

(12) United States Patent
Kang et al.
(10) Patent No.: US 12,809,063 B2
(45) Date of Patent: Nov. 24, 2026

(54) WINDOW PROTECTIVE FILM HAVING CONDUCTIVE POLYMER AND DISPLAY DEVICE INCLUDING THE SAME

(71) Applicant: SAMSUNG DISPLAY CO., LTD., Yongin-si (KR)

(72) Inventors: Su Hyoung Kang, Seoul (KR); Min Hyuck Kang, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 882 days.

(21) Appl. No.: 18/064,243

(22) Filed: Dec. 9, 2022

(65) Prior Publication Data

US 2023/0213687 A1 Jul. 6, 2023

(30) Foreign Application Priority Data

Dec. 31, 2021 (KR) ........................ 10-2021-0194597

(51) Int. Cl.

*G02B 1/14* (2015.01)
*C08J 7/04* (2020.01)

(Continued)

(52) U.S. Cl.

CPC ............. *G02B 1/14* (2015.01); *C08J 7/0423* (2020.01); *C08J 7/044* (2020.01); *C09D 1/00* (2013.01);

(Continued)

(58) Field of Classification Search

CPC . G02B 1/04; G02B 1/10–18; G02F 1/133305; G06F 1/1609; G06F 1/1652;

(Continued)

(56) References Cited

U.S. PATENT DOCUMENTS 10,234,693 B2 3/2019 Lim et al.
11,426,978 B2 8/2022 Ryu et al.

(Continued)

FOREIGN PATENT DOCUMENTS

CN 105552246 A 5/2016
CN 110343445 10/2019

(Continued)

OTHER PUBLICATIONS

Synthesis and application of hybrid materials based on plasmonic nanoparticles, Dissertation, Published in the year 2016 as per p. 157 of document.

(Continued)

*Primary Examiner* — Ryan S Dunning
(74) *Attorney, Agent, or Firm* — F. CHAU & ASSOCIATES, LLC

(57) ABSTRACT

The present disclosure provides a window protective film and a display device. The display device includes the window protective film. The window protective film includes a base layer, a soft coating layer disposed on the base layer, and an anti-fingerprint coating layer disposed on the soft coating layer. The soft coating layer includes a conductive polymer layer disposed on and in contact with a first surface of the base layer, a silica coating layer disposed on at least one side of the conductive polymer layer and that includes a plurality of silica nano particles, and a cover layer disposed on at least one side of the silica coating layer.

20 Claims, 18 Drawing Sheets

(51) Int. Cl.

| | |
|---|---|
| ***C08J 7/044*** | (2020.01) |
| ***C09D 1/00*** | (2006.01) |
| ***C09D 4/06*** | (2006.01) |
| ***C09D 5/24*** | (2006.01) |
| ***C09D 7/61*** | (2018.01) |
| ***C09D 183/08*** | (2006.01) |
| ***G02B 1/18*** | (2015.01) |
| ***G02F 1/1333*** | (2006.01) |
| ***G06F 1/16*** | (2006.01) |
| ***G09F 9/30*** | (2006.01) |

(52) U.S. Cl.
CPC ................. *C09D 4/06* (2013.01); *C09D 5/24* (2013.01); *C09D 7/61* (2018.01); *C09D 183/08* (2013.01); *G02B 1/18* (2015.01); *G02F 1/133305* (2013.01); *C08J 2375/04* (2013.01); *C08J 2377/00* (2013.01); *C08J 2383/04* (2013.01); *C08J 2483/08* (2013.01); *G06F 1/1609* (2013.01); *G06F 1/1641* (2013.01); *G06F 1/1652* (2013.01)

(58) Field of Classification Search
CPC ......... G06F 1/1641; G06F 2203/04102; G09F 9/301; H01L 51/0097; H01L 2251/5338; H04M 1/0268
See application file for complete search history.

(56) References Cited

U.S. PATENT DOCUMENTS

| | | | | |
|---|---|---|---|---|
| 11,772,364 | B2 | 10/2023 | Ryu et al. | |
| 12,117,592 | B2 | 10/2024 | Park et al. | |
| 2015/0301667 | A1* | 10/2015 | Yano | G06F 3/0445 345/173 |
| 2016/0259104 | A1* | 9/2016 | Lee | G02B 5/22 |
| 2016/0286673 | A1* | 9/2016 | Nam | B32B 15/08 |
| 2016/0307847 | A1* | 10/2016 | Lee | H01L 23/49827 |
| 2016/0369131 | A1 | 12/2016 | Lim et al. | |
| 2017/0356812 | A1* | 12/2017 | Madden | H03K 17/962 |
| 2017/0357348 | A1* | 12/2017 | Lee | G02B 1/14 |
| 2019/0373719 | A1* | 12/2019 | Lee | H10K 59/40 |
| 2020/0081162 | A1 | 3/2020 | Park et al. | |
| 2020/0157386 | A1* | 5/2020 | Kim | C08L 33/066 |
| 2021/0002847 | A1 | 1/2021 | Park et al. | |
| 2021/0199856 | A1 | 7/2021 | Park et al. | |

FOREIGN PATENT DOCUMENTS

| | | |
|---|---|---|
| EP | 3309229 | 4/2018 |
| KR | 10-2017-0000031 A | 1/2017 |
| KR | 10-2017-0141115 A | 12/2017 |
| KR | 10-2020-0030663 A | 3/2020 |
| KR | 10-2020-0039858 A | 4/2020 |
| KR | 10-2020-0133669 A | 11/2020 |
| KR | 10-2021-0104515 A | 8/2021 |
| WO | WO 2017164485 | 9/2017 |

OTHER PUBLICATIONS

"Mohamed M. Elsuthy," Enhanced distance-dependent fluorescence quenching using size tuneable core shell silica nanoparticles, RSC Adv., 2018, 8, 35840-35848.

Office Action dated Sep. 3, 2026 in corresponding Korean Patent Application Serial No. 10-2021-0194597, in Korean, 9 pages.

Office Action dated Oct. 28, 2026, in corresponding Chinese Patent Application No.202211532329.3, 13 pages.

* cited by examiner

WINDOW PROTECTIVE FILM HAVING CONDUCTIVE POLYMER AND DISPLAY DEVICE INCLUDING THE SAME

CROSS-REFERENCE TO RELATED APPLICATION

This application claims priority under 35 U.S.C. 119 from Korean Patent Application No. 10-2021-0194597, filed on Dec. 31, 2021 in the Korean Intellectual Property Office, the contents of which are herein incorporated by reference in their entirety.

TECHNICAL FIELD

Embodiments of the disclosure are directed to a window protective film and a display device that includes the same, and more particularly, to a stretchable display device that includes the window protective film.

DISCUSSION OF THE RELATED ART

Display devices are included in various electronic devices, such as smartphones, digital cameras, notebook computers, navigation devices, and smart televisions. The importance of display devices is increasing with the development of multimedia. Accordingly, various types of display devices, such as an organic light-emitting display (OLED) device or a liquid crystal display (LCD) device, are being used.

The demand for flexible display devices has been increasing. Among flexible display devices, stretchable display devices that can be expanded and contracted have wide applications. Stretchable display devices can be used as display devices whose purpose is to be stretched but can also be included in bendable display devices, foldable display devices, or rollable display devices for effective bending, folding, or rolling.

SUMMARY

Embodiments of the disclosure provide a window protective film with enhanced wear resistance and chemical resistance, and a display device that includes the window protective film.

According to an embodiment of the disclosure, a window protective film comprises a base layer, a soft coating layer disposed on the base layer, and an anti-fingerprint coating layer disposed on the soft coating layer. The soft coating layer comprises a conductive polymer layer disposed on and in contact with a first surface of the base layer, a silica coating layer disposed on at least one side of the conductive polymer layer and that includes a plurality of silica nano particles, and a cover layer disposed on at least one side of the silica coating layer.

In an embodiment, the conductive polymer layer comprises a plurality of protrusions that extend outward from one side of the conductive polymer layer, and a plurality of voids.

In an embodiment, the base layer comprises at least one of a polyether block amide-based polymer, a silicone-based polymer, and a urethane-based polymer.

In an embodiment, a thickness of the base layer is from 70 μm to 100 μm.

In an embodiment, the conductive polymer layer comprises at least one of a polythiophene-based compound, a polypyrrole-based compound, a polyaniline-based compound, a polyacetylene-based compound, and a polyphenylenether-based compound.

In an embodiment, a modulus of the soft coating layer is from 500 MPa to 2 GPa.

In an embodiment, the soft coating layer comprises an organic material and an inorganic material.

In an embodiment, the organic material comprises at least one of an acrylate-based compound, a polyurethane-based compound, an epoxy-based compound, a carboxylic acid-based compound, and a maleimide-based compound, and the inorganic material comprises at least one of silicon oxide ($SiO_2$), zirconium oxide ($ZrO_2$), aluminum oxide ($Al_2O_3$), tantalum oxide ($Ta_2O_5$), niobium oxide ($Nb_2O_5$ or $NbO_2$), antimony (Sb), phosphorus (P), antimony tin oxide (ATO), and phosphorus tin oxide (PTO), or the inorganic material is glass bead.

In an embodiment, the anti-fingerprint coating layer comprises a fluorine-containing silane compound represented by the following Formula 1:

$$Y-(CH_2)_{n1}-\underset{\displaystyle}{\overset{[X_3]_{n5}}{\underset{}{Si}}}-[X_1-[(CH_2)_{n2}-X_2]_{n3}]_{n4}$$

In Formula 1, $X_1$ to $X_3$ is each independently one of a substituted or unsubstituted amine group, a methoxy group, a hydroxyl group, dimethyl monoalkoxysilane, monometal dialkoxysilane, trialkoxysilane, silazane, ethylene glycol, triethylene glycol, mercapto, ester, alkoxy, methacrylic, acrylic, carboxylic acid, cyclic amine, epoxy, fluorocarbon, azide, benzophenone, isocyanate, hydrogen, and a combination thereof, Y is one of perfluoropolyether (PFPE), polytetrafluoroethylene (PTFE), fluorinated ethylene propylene (FEP), and perfluoroalkyl vinyl ether copolymer, and n1 to n5 are each independently an integer from 1 to 10.

In an embodiment, a thickness of the soft coating layer is from 300 nm to 500 nm.

In an embodiment, the soft coating layer comprises an additive, and the additive comprises at least one of 1,6-Hexaneciol diacrylate (HDDA), 1,10-Decanediol diacrylate (DDDA), bisphenol A (EO)4 diacrylate (BPA(EO)4DA), bisphenol A (EO)3 diacrylate (BPA(EO)3DA), bisphenol A (EO)10 diacrylate (BPA(EO)10DA), bisphenol A (EO)20 diacrylate (BPA(EO)20DA), bisphenol A (EO)30 diacrylate (BPA(EO)30DA), tricylclodecane dimethanol diacrylate (TCDDA), polyethylene glycol 400 diacrylate (PEG400DA), polyethylene glycol 300 diacrylate (PEG300DA), polyethylene glycol 200 diacrylate (PEG200DA), polyethylene glycol 600 diacrylate (PEG600DA), bisphenol F(EO)4 diacrylate (BPF(EO)4DA), and polypropylene glycol 400 diacrylate (PPG400DA).

In an embodiment, wherein a thickness of the anti-fingerprint coating layer is from 20 nm to 100 nm.

According to an embodiment of the disclosure, a display device comprises a display panel that includes one surface located at front of the display device and a front stacked structure on the one surface of the display panel. The front stacked structure comprises a window and a window protective film attached on the window. The window protective film comprises a base layer, a soft coating layer disposed on the base layer, and an anti-fingerprint coating layer disposed on the soft coating layer. The soft coating layer comprises a conductive polymer layer disposed on and in contact with a first surface of the base layer, a silica coating layer disposed on at least one side of the conductive polymer layer and that includes a plurality of silica nano particles, and a cover layer disposed on at least one side of the silica coating layer.

In an embodiment, the front stacked structure comprises an impact absorbing layer disposed between the display panel and the window and an impact absorbing layer bonding member that attaches the impact absorbing layer onto the display panel.

In an embodiment, the display panel comprise an other surface located at a rear of the display panel, and the display device further comprise a rear stacked structure stacked on the other surface of the display panel. The rear stacked structure comprises a polymer layer disposed at the rear of the display panel, a cushion layer disposed at a rear of the polymer layer, a plate disposed at a rear of the cushion layer, and a heat dissipation member disposed at a rear of the plate.

In an embodiment, the base layer comprises at least one of a polyether block amide-based polymer, a silicone-based polymer, and a urethane-based polymer.

In an embodiment, the conductive polymer layer comprises at least one of a polythiophene-based compound, a polypyrrole-based compound, a polyaniline-based compound, a polyacetylene-based compound, and a polyphenylenether-based compound.

In an embodiment, a modulus of the soft coating layer is from 500 MPa to 2 GPa.

In an embodiment, the soft coating layer comprises an additive, and the additive comprises at least one of 1,6-Hexaneciol diacrylate (HDDA), 1,10-Decanediol diacrylate (DDDA), bisphenol A (EO)4 diacrylate (BPA(EO)4DA), bisphenol A (EO)3 diacrylate (BPA(EO)3DA), bisphenol A (EO)10 diacrylate (BPA(EO)10DA), bisphenol A (EO)20 diacrylate (BPA(EO)20DA), bisphenol A (EO)30 diacrylate (BPA(EO)30DA), tricylclodecane dimethanol diacrylate (TCDDA), polyethylene glycol 400 diacrylate (PEG400DA), polyethylene glycol 300 diacrylate (PEG300DA), polyethylene glycol 200 diacrylate (PEG200DA), polyethylene glycol 600 diacrylate (PEG600DA), bisphenol F(EO)4 diacrylate (BPF(EO)4DA), and polypropylene glycol 400 diacrylate (PPG400DA).

In an embodiment, the soft coating layer comprises an organic material and an inorganic material. The organic material comprises at least one of an acrylate-based compound, a polyurethane-based compound, an epoxy-based compound, a carboxylic acid-based compound, and a maleimide-based compound, and the inorganic material comprises at least one of silicon oxide ($SiO_2$), zirconium oxide ($ZrO_2$), aluminum oxide ($Al_2O_3$), tantalum oxide ($Ta_2O_5$), niobium oxide ($Nb_2O_5$ or $NbO_2$), antimony (Sb), phosphorus (P), antimony tin oxide (ATO), and phosphorus tin oxide (PTO), or the inorganic material is glass bead.

According to embodiments of the disclosure, a window protective film and a display device that includes the window protective film increase wear resistance and chemical resistance such that fingerprints do not remain on the display device even after repeated modified movements.

DETAILED DESCRIPTION

Embodiments of the invention will now be described more fully hereinafter with reference to the accompanying drawings. Embodiments may, however, take different forms and should not be construed as limited to embodiments set forth herein.

It will also be understood that when a layer or substrate is referred to as being "on" another layer or substrate, it can be directly on the other layer or substrate, or intervening layers may also be. The same reference numbers may indicate the same components throughout the specification.

Hereinafter, embodiments of the disclosure will be described with reference to the attached drawings.

Figure 1:
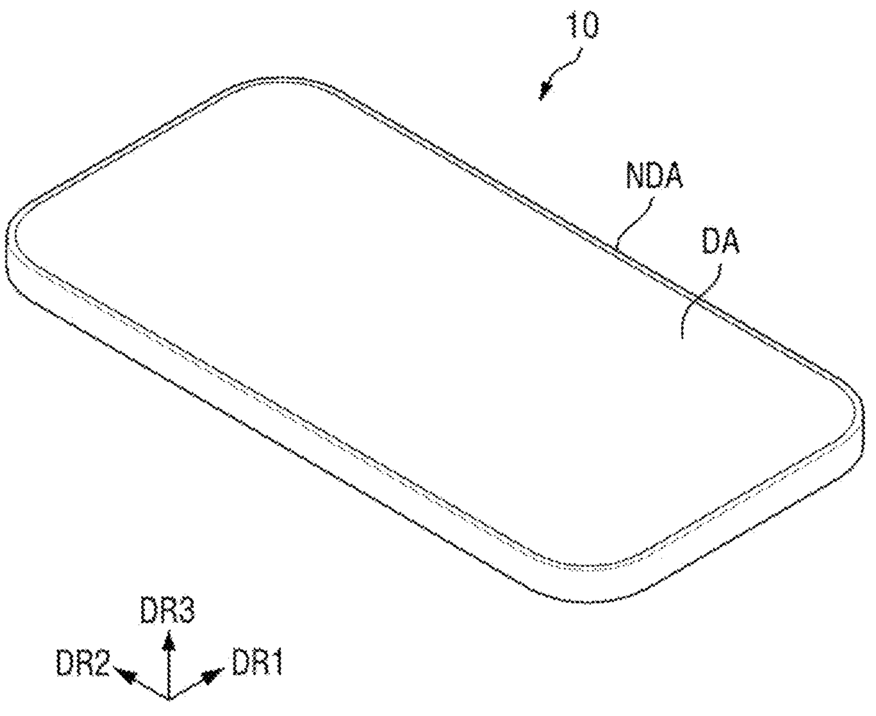
FIG. 1 is a perspective view of a display device according to an embodiment of the disclosure.

FIG. 1 is a perspective view of a display device 10 according to an embodiment of the disclosure.

Throughout the specification, a first direction DR1 and a second direction DR2 refer to directions that cross each other. A third direction DR3 is a direction perpendicular to a plane defined by the first direction DR1 and the second direction DR2, and indicates a thickness direction. The drawings show that the first direction DR1 is a horizontal direction in a plan view and the second direction DR2 is a vertical direction in a plan view, but embodiments of the disclosure are not necessarily limited thereto.

Referring to FIG. 1, a display device 10 may be a flexible display device, such as stretchable, foldable, bendable, or rollable display device. Although the display device 10 will be mainly described with reference to being included in a smart phone, embodiments are not necessarily limited thereto. For example, the display device 10 may be included in a portable phone, a tablet personal computer (PC), a personal digital assistant (PDA), a portable multimedia players (PMP), a television, a game console, a wrist-watch type electronic device, a head mount display, a monitor of a personal computer, a notebook computer, a car navigator, a car dashboard, a digital camera, a camcorder, a billboard, a medical device, an inspection device, various home appliances such as a refrigerators or a washing machine, and Internet of things (IoT) devices, in addition to smartphones.

Figure 2:
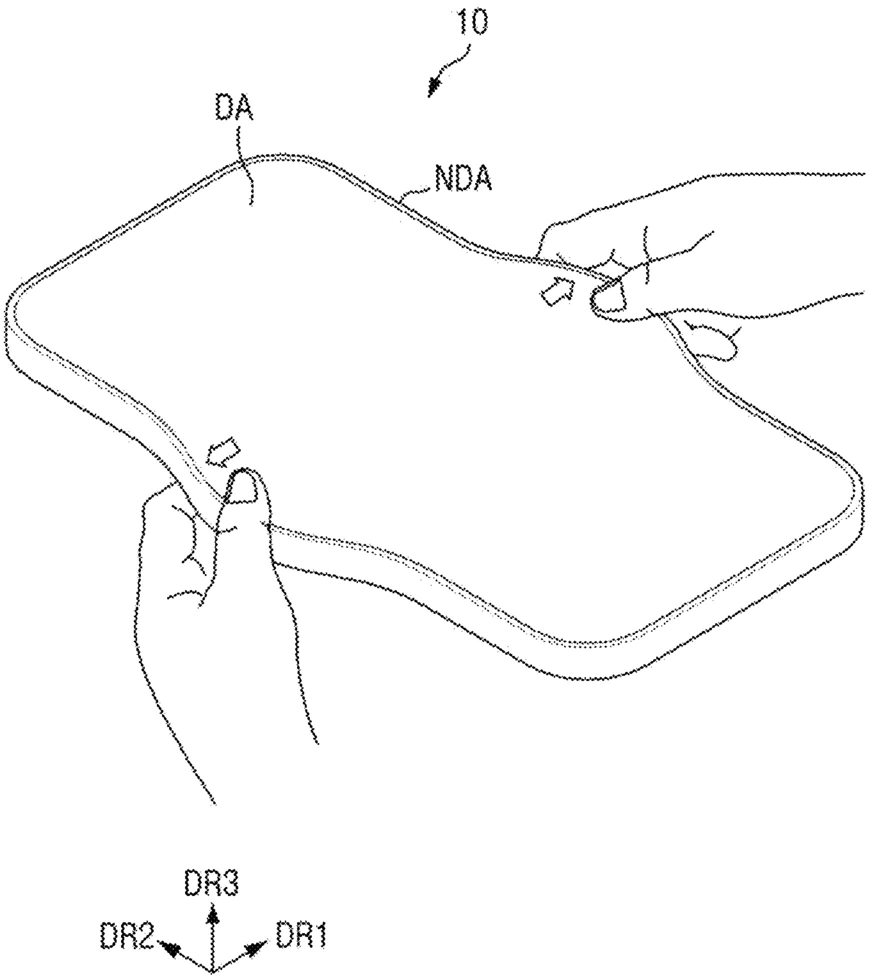
FIG. 2 illustrates a state in which a display device of FIG. 1 is stretched in a horizontal direction.

In FIGS. 1 and 2, the first direction DR1 is parallel to one side of the display device 10 when viewed in a plan view, such as a horizontal direction of the display device 10. The second direction DR2 is parallel to a side of the display device that contacts the one side of the display device 10 when viewed in a plan view, such as a vertical direction of the display device 10. The third direction DR3 is a thickness direction of the display device 10.

In an embodiment, the display device 10 have a rectangular shape when viewed in a plan view. The display device 10 may have a generally rectangular shape where corners are right angle or a generally rectangular shape where corners are round when viewed in a plan view. The display device 10 may include two short sides arranged in the first direction DR1 and two long sides arranged in the second direction DR2 when viewed in a plan view.

The display device 10 includes a display area DA and a non-display area NDA. The shape of the display area DA corresponds to the shape of the display device 10 when viewed in a plan view. For example, when the display device 10 has a rectangular shape when viewed in a plan view, the display area DA also has a rectangular shape.

The display area DA is where a plurality of pixels are provided that display an image. The plurality of pixels are arranged as a matrix. Each of the plurality of pixels has one of a rectangular shape, a rhombus shape, and a square shape when viewed in a plan view, but the shape thereof is not necessarily limited thereto. For example, each of the plurality of pixels may have other polygonal shape, a circular shape, or an elliptic shape in addition to rectangular, rhombus, or square shapes when viewed in a plan view.

The non-display area NDA is where no pixels are provided so an image is not displayed. The non-display area NDA is disposed around the display area DA. The non-display area NDA surrounds the display area DA as shown in FIGS. 1 and 2, but embodiments of the disclosure are not necessarily limited thereto. For example, in an embodiment, the display area DA is partially surrounded by the non-display area NDA.

Figure 3:
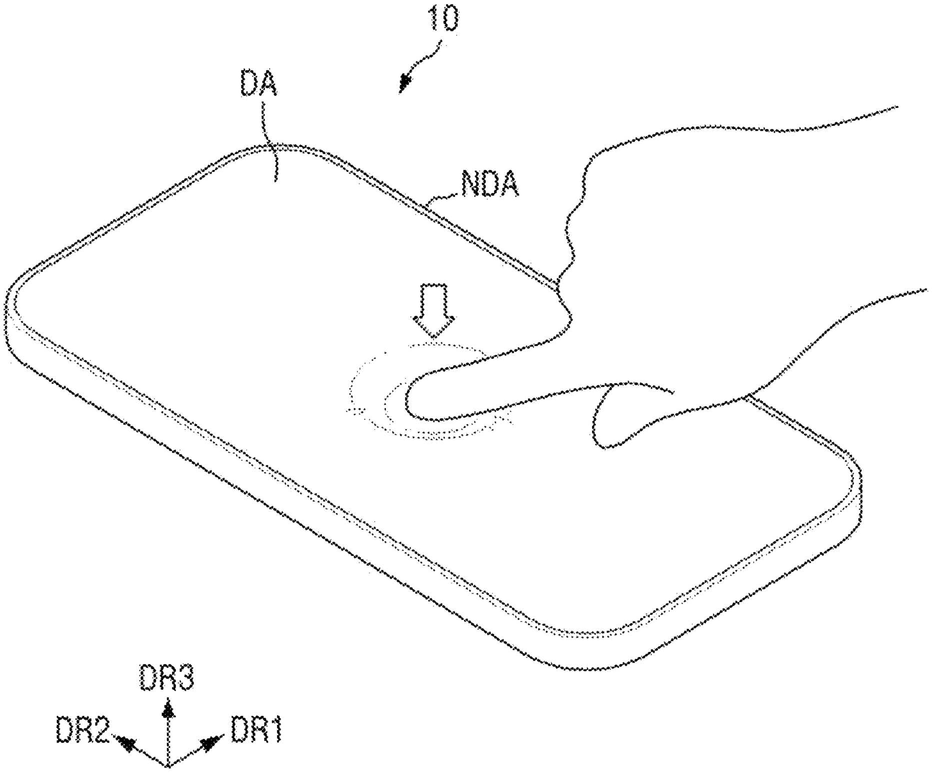
FIG. 3 illustrates a state in which a display device of FIG. 1 is locally stretched.

FIGS. 2 and 3 illustrate examples of a stretchable display device 10. FIG. 2 illustrates a state in which a display device 10 of FIG. 1 is stretched in a horizontal direction. FIG. 3 illustrates a state in which a display device 10 of FIG. 1 is locally stretched.

Referring to FIG. 2, in an embodiment, the display device 10 is expanded in a horizontal direction. For example, when edges of the display device 10 are grasped and stretched in directions away from the edges, the display device 10 expands in the stretched directions. As the display device 10 expands, the area of the display device 10 in a plan view (i.e., an overall planar area) increases. In the drawing, although the display device 10 is illustrated as being expanded in the first direction DR1, the display device 10 may be expanded in the second direction DR2, in both the first direction DR1 and the second direction DR2, or in another horizontal direction. The display device 10 may be expanded by an external force and contracts to return to an original state thereof when the external force is removed.

Referring to FIG. 3, in an embodiment, the display device 10 may be locally expanded while an overall planar area is maintained. For example, as illustrated in the drawing, when the display device 10 is pressed in the third direction DR3, the display device 10 locally expands with respect to the pressed point. The direction in which the display device 10 expands is inclined with respect to the horizontal direction, and the overall planar area of the display device 10 is maintained equal to that before being expanded. Once the pressing force (also referred to as a pressure) is removed, the portion that was expanded contracts again and returns to the original state.

The expanding in FIG. 2 and the expanding in FIG. 3 may occur simultaneously. For example, not only the planar area is locally increased in a direction inclined with respect to the horizontal direction due to the pressure in the thickness direction, but also the overall planar area is further increased.

As described above, a window protective film 210 (see, e.g., FIG. 4) is disposed on a display panel 100 (see, e.g., FIG. 4) to enhance wear resistance and chemical resistance so that fingerprints do not remain on the display device 10 even after repeated modified movements. Reference is made to FIGS. 6 to 9 for a detailed description thereof.

Figure 4:
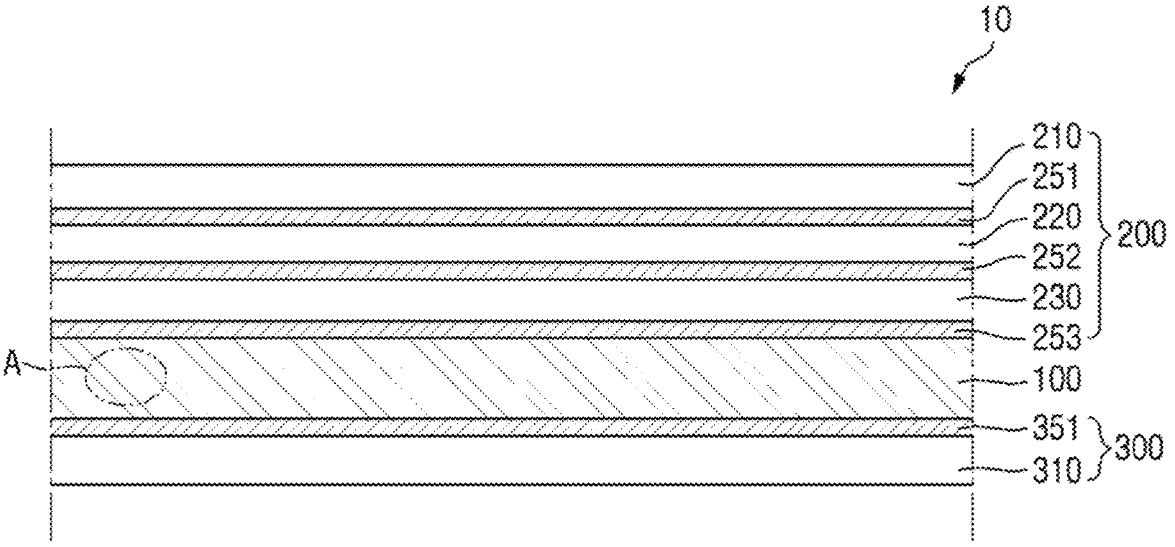
FIG. 4 is a cross-sectional view of a display device according to an embodiment.

FIG. 4 is a cross-sectional view of a display device 10 according to an embodiment.

Referring to FIG. 4, in an embodiment, a display device 10 includes the display panel 100, a front stacked structure 200 that is stacked on the front of the display panel 100, and a rear stacked structure 300 that is stacked on the rear of the display panel 100. Each of the stacked structures 200 and 300 includes at least one bonding member 251 to 253 and 351. The front of the display panel 100 refers to a portion from which the display panel 100 displays an image, and the rear of the display panel 100 refers to a portion opposite to the front of the display panel 100. One surface of the display panel 100 is located at the front of the display panel 100, and the other surface of the display panel 100 is located at the rear of the display panel 100.

The display panel 100 displays an image, and examples thereof include a self-light-emitting display panel such as an organic light-emitting display (OLED) panel, an inorganic light-emitting (inorganic EL) display panel, a quantum dot light-emitting display (QED) panel, a micro light-emitting diode (micro-LED) display panel, a nano light-emitting diode (nano-LED) display panel, a plasma display panel (PDP), a field emission display (FED) panel, or a cathode ray (CRT) display panel; and light-receiving display panels such as a liquid crystal display (LCD) panel or an electrophoretic display (EPD) panel. Hereinafter, an organic light-emitting display panel will be described as an example of the display panel 100, and unless otherwise specified, the organic light-emitting display panel included in an embodiment will be simply referred to as a display panel 100. However, embodiments are not necessarily limited to an organic light-emitting display panel, and embodiments may include other display panels listed above or known in the art.

Figure 5:
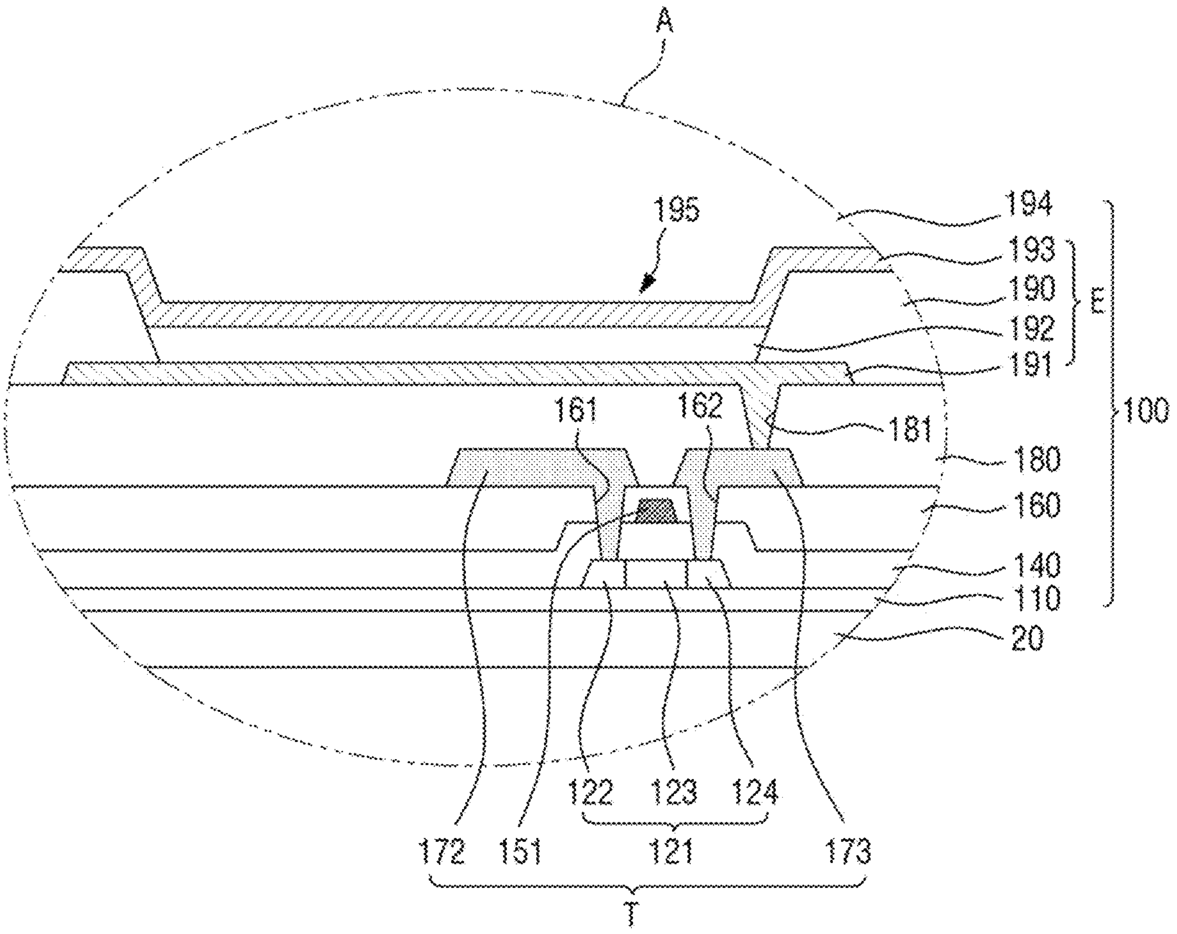
FIG. 5 is an enlarged cross-sectional view of portion A of a display device of FIG. 4.

FIG. 5 is an enlarged cross-sectional view of portion A of a display device 10 of FIG. 4.

Referring to FIG. 5, in an embodiment, the display panel 100 includes a substrate 20, a buffer layer 110, an active layer 121, a gate insulating layer 140, a gate electrode 151, an interlayer insulating layer 160, a source electrode 172, a drain electrode 173, a passivation layer 180, an organic light-emitting element E, and an encapsulation layer 194.

The substrate 20 is a base substrate of the display panel 100. The substrate 20 is flexible so that the display device can maintain its performance even when the display device is bent. To this end, the substrate 20 includes an elastic material.

In an embodiment, the substrate 20 includes polyimide, but is not necessarily limited thereto. In an embodiment, the substrate 20 includes a material, such as flexible glass, etc.

The buffer layer 110 is disposed on the substrate 20. The buffer layer 110 is disposed directly on the substrate 20. The buffer layer 110 includes at least one of silicon nitride ($SiN_x$), silicon oxide ($SiO_x$), and silicon oxynitride ($SiO_xN_y$), and may be formed as a single layer or as multiple layers. The buffer layer 110 prevents the infiltration of impurities, moisture, or outside air that can degrade semiconductor characteristics, and provides a flat surface.

The active layer 121 is disposed on the buffer layer 110. The active layer 121 includes a semiconductor and is made of polysilicon.

The active layer 121 includes a channel region 123, and a source region 122 and a drain region 124 adjacent to each side of the channel region 123. The channel region 123 includes an intrinsic semiconductor, such as undoped polysilicon, and the source region 122 and the drain region 124 are made of an impurity semiconductor, such as polysilicon doped with conductive impurities.

The gate insulating layer 140 is disposed on the active layer 121 and the buffer layer 110. The gate insulating layer 140 includes at least one of silicon nitride, silicon oxide, and silicon oxynitride, and may be formed as a single layer or as multiple layers.

The gate electrode 151 is disposed on the gate insulation layer 140. The gate electrode 151 includes at least one of aluminum (Al), molybdenum (Mo), copper (Cu), and an alloy thereof, and has a multi-layer structure.

The interlayer insulating layer 160 is disposed on the gate electrode 151 and the gate insulation layer 140. The interlayer insulating layer 160 includes at least one of silicon nitride, silicon oxide, and silicon oxynitride, etc., and may be formed as a single layer or as multiple layers.

The source electrode 172 and the drain electrode 173 are disposed on the interlayer insulating layer 160. The source electrode 172 overlaps the source region 122 of the active layer 121, and the drain electrode 173 overlaps the drain region 124 of the active layer 121.

A source contact hole 161 and a drain contact hole 162 are formed in the gate insulating layer 140 and the interlayer insulating layer 160 to electrically connect the source electrode 172 and the drain electrode 173 with the source region 122 and the drain region 124 of the active layer 121, respectively.

The active layer 121, the gate electrode 151, the source electrode 172, and the drain electrode 173 of the display device 10 (see, e.g., FIG. 4) may constitute a thin film transistor T. The drain electrode 173, which is the output terminal, is electrically connected to an anode electrode 191 through a contact hole 181.

The passivation layer 180 is formed on the source electrode 172, the drain electrode 173 and the interlayer insulating layer 160. The passivation layer 180 includes at least one of silicon nitride, silicon oxide, silicon oxynitride, a low dielectric acryl-based organic compound, benzocyclobutane (BCB), and perfluorocyclobutane (PFCB), etc.

The passivation layer 180 protects the source electrode 172 and the drain electrode 173, and functions as a planarization layer to provide a flat upper surface. The contact hole 181 through which the drain electrode 173 is exposed is formed in the passivation layer 180.

The organic light-emitting element E is disposed on the passivation layer 180. The organic light-emitting element E includes the anode electrode 191, a pixel defining layer 190, an organic emissive layer 192, and a cathode electrode 193.

The anode electrode 191 is disposed at the bottom of the organic light-emitting element E. The anode electrode 191 is electrically connected to the drain electrode 173 through the contact hole 181 in the passivation layer 180, and is a pixel electrode of the organic light-emitting element E.

The anode electrode 191 includes a high work function material layer including a material, such as tin oxide (ITO), indium zinc oxide (IZO), zinc oxide (ZnO) and/or indium oxide ($In_2O_3$). Furthermore, the anode electrode 191 includes a stack of layers that include the above-described high work function material layer and a reflective metal layer including a material, such as lithium (Li), calcium (Ca), lithium fluoride (LiF) aluminum (Al), silver (Ag), magnesium (Mg), and/or gold (Au) or a material that has a multi-layered structure such as lithium fluoride/calcium (LiF/Ca) or lithium fluoride/aluminum (LiF/Al).

The pixel defining layer 190 is disposed on the anode electrode 191 and the passivation layer 180. The pixel defining layer 190 includes a resin, such as polyacrylates and/or polyimides. The pixel defining layer 190 separates each pixel of the organic light-emitting element E, and includes an opening 195 through which the anode electrode 191 is exposed.

The organic emissive layer 192 is disposed on the anode electrode 191 exposed through the opening 195 of the pixel defining layer 190. The organic emissive layer 192 includes multiple layers that include one or more of a hole injection layer (HIL), a hole transport layer (HTL), an electron transport layer (ETL), an electron injection layer (EIL), and/or an emissive layer (EML).

The cathode electrode 193 is disposed on the pixel defining layer 190 and the organic emissive layer 192. The cathode electrode 193 includes at least one of Li, Ca, LiF, Al, Mg, Ag, platinum (Pt), palladium (Pd), nickel (Ni), Au, neodymium (Nd), iridium (Ir), chromium (Cr), barium fluoride ($BaF_2$), barium (Ba), a compound thereof, and a mixture thereof, such as Ag and Mg, or has a multi-layered structure such as LiF/Ca or LiF/Al. The cathode electrode 193 is a common electrode of the organic light-emitting element E.

The encapsulation layer 194 is disposed on the cathode electrode 193. The encapsulation layer 194 prevents or reduces moisture or air from permeating into the organic light-emitting element E and oxidizing the organic light-emitting element E, and also provides a flat surface.

In addition, in an embodiment, the display panel 100 further includes a touch sensing unit that is attached thereto or included therein. For example, the touch sensing unit is disposed on the encapsulation layer 194, and the touch sensing unit acquires the coordinate information of a point where that has received an input. The touch sensing unit may be disposed on the entire surface of the display panel 100. However, the positional relationship between the display panel 100 and the touch sensing unit is not necessarily limited thereto. The touch sensing unit may be a contact touch sensing unit or a non-contact touch sensing unit. A resistance touch sensing unit, an electromagnetic induction touch sensing unit, and/or a capacitance touch sensing unit may be used, and the kind of touch sensing unit is not particularly limited thereto.

The display panel 100 further includes a polarizing unit disposed between the touch sensing unit and the encapsulation layer 194, but embodiments of the disclosure are not necessarily limited thereto. The polarizing unit may be omitted.

Referring back to FIG. 4, in an embodiment, the front stacked structure 200 is disposed on the front of the display panel 100. The front stacked structure 200 includes an impact absorbing layer 230, a window 220, and a window protective film 210 that are sequentially stacked frontward from the display panel 100.

The impact absorbing layer 230 protects the underlying display panel 100, etc., from an external impact.

In an embodiment, the impact absorbing layer 230 is a polymer layer. The polymer layer includes at least one of polyethylene terephthalate (PET) resin, polyethylene naphthalate (PEN) resin, polyether sulfone (PES) resin, polyimide (PI) resin, polyarylate (PAR) resin, polycarbonate (PC) resin, polymethyl methacrylate (PMMA) resin, and a cycloolefin copolymer (COC) resin.

By adjusting the thickness and the tensile modulus of the impact absorbing layer 230, the period of time during which an impact force is transmitted can be increased. However, the thickness of the impact absorbing layer 230 cannot be increased infinitely as the overall thickness is limited and the radius of curvature is also limited.

In an embodiment, the thickness of the impact absorbing layer 230 ranges from 70 μm to 150 μm. The impact absorbing layer 230 can sufficiently mitigate the impact of an externally applied force if the thickness is 70 μm or greater. In addition, cracks can be suppressed if the thickness is 150 μm or less. However, the thickness of the impact absorbing layer 230 is not necessarily limited to the above-described thickness range.

The window 220 protects the display panel 100. The window 220 is formed of a transparent material. The window 220 includes, for example, at least one of glass, plastic, and a mixture thereof.

When the window 220 includes glass, the glass is an ultra-thin glass (UTG) or a thin glass. When the window 220 includes UTG or thin glass, the window 220 is flexible, e.g., bendable, foldable, or rollable. Specifically, glass having a thickness of, such as from about 10 μm to about 300 μm or about 30 may be used. The window 220 includes at least one of soda lime glass, alkali alumino silicate glass, borosilicate glass, lithium alumina silicate glass, and a combination thereof.

The window 220 includes a chemically- or thermally strengthened glass. A chemically strengthened glass is obtained by an ion exchange treatment that uses an alkali salt, and the ion exchange treatment is performed two or more times. The window 220 is a polymer layer that has both surfaces coated with the thin glass.

When the window 220 includes plastic, the window 220 is flexible, such as stretchable. The window 220 includes, but is not necessarily limited to, at least one of polyimide (PI), polyacrylate, polymethyl methacrylate (PMMA), polycarbonate (PC), polyethylene naphthalate (PEN), polyvinylidene chloride, polyvinylidene difluoride (PVDF), polystyrene, ethylene vinyl alcohol copolymer, polyethersulphone (PES), polyetherimide (PEI), polyphenylene sulfide (PPS), polyallylate, tri-acetyl cellulose (TAC), and cellulose acetate propionate (CAP). The plastic window 220 includes one or more of the plastic materials listed above.

The window protective film 210 is disposed on the front of the window 220. The window protective film 210 performs at least one of scattering prevention, shock absorption, dent prevention, fingerprint prevention, and glare prevention, etc., for the window 220. The window protective film 210 includes a transparent polymer layer. The transparent polymer layer includes at least one of a polyethylene terephthalate (PET) resin, a polyethylene naphthalate (PEN) resin, a polyether sulfone (PES) resin, a polyimide (PI) resin, a polyarylate (PAR) resin, a polycarbonate (PC) resin, a polymethyl methacrylate (PMMA) resin, and a cycloolefin copolymer (COC) resin.

A detailed description of the window protective film 210 will be provided below.

The front stacked structure 200 further includes front bonding members 251 to 253 that bond adjacent stacked members. For example, a first bonding member 251 is disposed between the window 220 and the window protective film 210 and bonds the window 220 and the window protective film 210, a second bonding member 252 is disposed between the window 220 and the impact absorbing layer 230 and bonds the window 220 and the impact absorbing layer 230, and a third bonding member 253 is disposed between the impact absorbing layer 230 and the display panel 100 and bonds the impact absorbing layer 230 and the display panel 100. For example, the front bonding members 251 to 253 attach the layers on one surface of the display panel 100, and the first bonding member 251 is a protective film bonding member that attaches the window protective film 210, the second bonding member 252 is a window bonding member that attaches the window 220, and the third bonding member 253 is an impact absorbing layer bonding member that attaches the impact absorbing layer 230. The front bonding members 251 to 253 are all optically transparent.

The rear stacked structure 300 is disposed on the rear of the display panel 100. The rear stacked structure 300 is stacked rearward from the display panel 100, and the rear stacked structure 300 includes a fourth bonding member 351 and a polymer layer 310. However, embodiments of the disclosure are not necessarily limited thereto, and in an embodiment, the rear stacked structure 300 further includes at least one of a cushion layer, a plate, and a heat dissipation member. For example, the rear stacked structure 300 may comprise the polymer layer 310 disposed at a rear of the display panel 100, the cushion layer disposed at a rear of the polymer layer 310, the plate disposed at a rear of the cushion layer, and the heat dissipation member disposed at a rear of the plate.

The polymer layer 310 includes, for example, at least one of polyimide (PI), polyethylene terephthalate (PET), polycarbonate (PC), polyethylene (PE), polypropylene (PP), polysulfone (PSF), polymethyl methacrylate (PMMA), triacetyl cellulose (TAC), and a cycloolefin polymer (COP), etc.

The polymer layer 310 includes a functional layer on at least one surface thereof. The functional layer includes, for example, a light absorbing layer. The light absorbing layer includes a light absorbing material, such as a black pigment or dye. The light absorbing layer is formed on the polymer layer 310 by a coating or printing method with black ink.

The cushion layer absorbs external impacts and prevents damage to the display panel 100. The cushion layer may be formed of a single layer or a plurality of stacked layers. The cushion layer includes, for example, an elastic material, such as polyurethane or a polyethylene resin. In an embodiment, the cushion layer is made of a foam material similar to a sponge.

The plate is a support member that couples the display device 10 to a case. The plate includes a rigid material. In an embodiment, the plate is formed of a single metal or a metal alloy such as stainless steel (SUS).

The heat dissipation member prevents the propagation of heat generated from the display panel 100 or other portions of the display device 10. The heat dissipation member includes a metal plate. For example, the heat dissipation member includes a highly thermally conductive metal such as copper or silver, etc. In addition, the heat dissipation member may be a sheet that includes graphite or carbon nanotubes.

Hereinafter, the window protective film 210 disposed on the front of the window 220 will be described.

Figure 6:
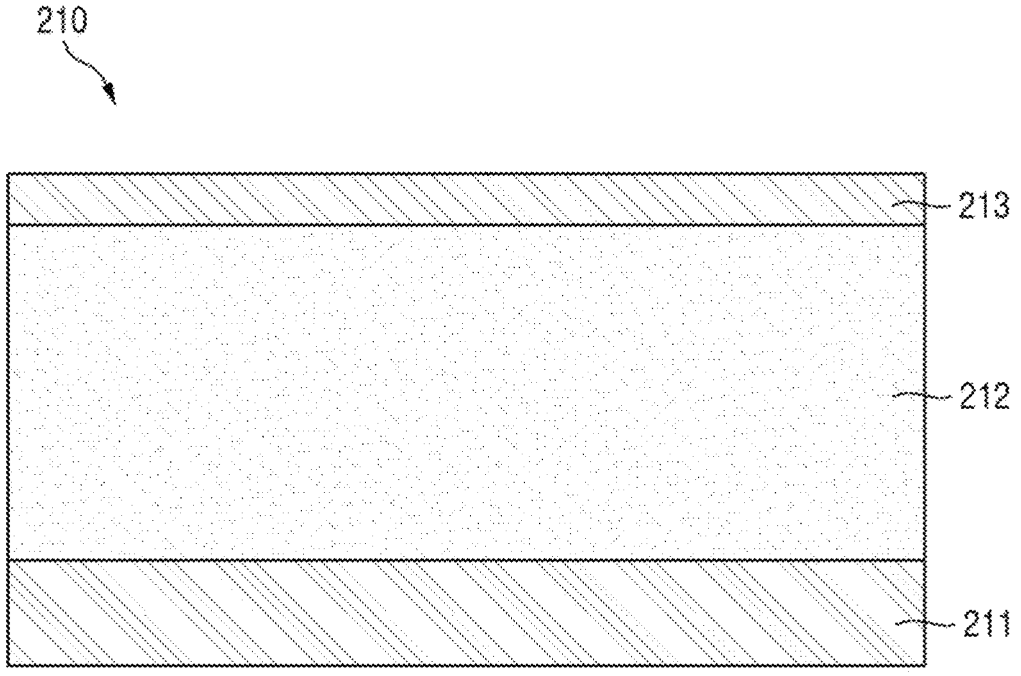
FIG. 6 is a cross-sectional view of a window protective film.

FIG. 6 is a cross-sectional view of the window protective film 210.

Referring to FIG. 6, the window protective film 210 according to an embodiment includes a base layer 211, a soft coating layer 212 disposed on the base layer 211, and an anti-fingerprint coating layer 213 disposed on the soft coating layer 212. However, embodiments of the disclosure are not necessarily limited thereto. For example, in an embodiment, the window protective film 210 further includes at least one of an anti-fouling coating layer, an anti-reflection coating layer, an anti-glare coating layer, and a hard coating layer.

The base layer 211 includes a transparent polymer layer. The transparent polymer layer includes at least one of a polyethylene terephthalate (PET) resin, a polyethylene naphthalate (PEN) resin, a polyether sulfone (PES) resin, a polyimide (PI) resin, a polyarylate (PAR) resin, a polycarbonate (PC) resin, a polymethyl methacrylate (PMMA) resin, a cycloolefin copolymer (COC) resin, and a polyether block amide (PEBA) resin. However, embodiments of the disclosure are not necessarily limited thereto.

In addition, the base layer 211 is provided using a self-restoring composition that includes an elastomer resin, which is any one of a silicone, a urethane, and a urethane acrylate. In the base layer 211, the urethane acrylate resins are included in a ladder structure that is supported by an aromatic group, a heteroaromatic group, or both.

The aromatic urethane acrylate resins are urethane acrylate resins that include 2 to 5 functional groups on average and are provided by reacting a polymerizable composition that includes an acrylate, which includes a hydroxyl group, with an isocyanate compound. At least one of the acrylate and the isocyanate compound includes an aromatic group, a heteroaromatic group, or both, but embodiments of the disclosure are not necessarily limited thereto.

In an embodiment, the base layer 211 has a single-layer structure. For example, the base layer 211 is formed of one base layer. However, embodiments of the disclosure are not necessarily limited thereto, and in an embodiment, the base layer 211 has a multi-layer structure.

In an embodiment, the thickness of the base layer 211 ranges from 70 μm to 100 μm, and has a modulus of from 50 MPa to 200 MPa.

By having a thickness within the above range, the window protective film 210 exhibits sufficient bending and self-restoring properties without excessively increasing the total thickness of the window protective film 210. Thus, the window protective film 210 will have a uniform performance over a long period of time.

In addition, when the modulus of the base layer 211 is within the above range, the probability of buckling that occurs due to differences in shear stress with other layers when the base layer 211 is stacked is reduced.

The soft coating layer 212 is disposed on the base layer 211. The soft coating layer 212 has a thickness and modulus characteristics such that the window protective film 210 is not damaged even when the display device 10 (see, e.g., FIG. 4) is repeatedly folded and unfolded.

In addition, the soft coating layer 212 further includes an initiator or additive that causes an optical or chemical reaction.

In an embodiment, the soft coating layer 212 is directly formed on one surface of the base layer 211. For example, the soft coating layer 212 is directly coated on the base layer 211 without an adhesive layer. However, embodiments of the disclosure are not necessarily limited thereto, and in an embodiment, the soft coating layer 212 is attached on the base layer 211 through an adhesive layer.

Figure 7:
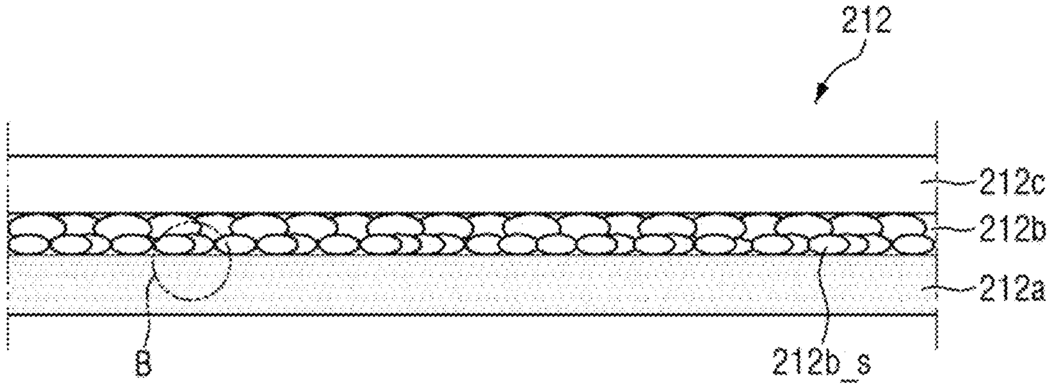
FIG. 7 is a cross-sectional view of a soft coating layer.
Figure 8:
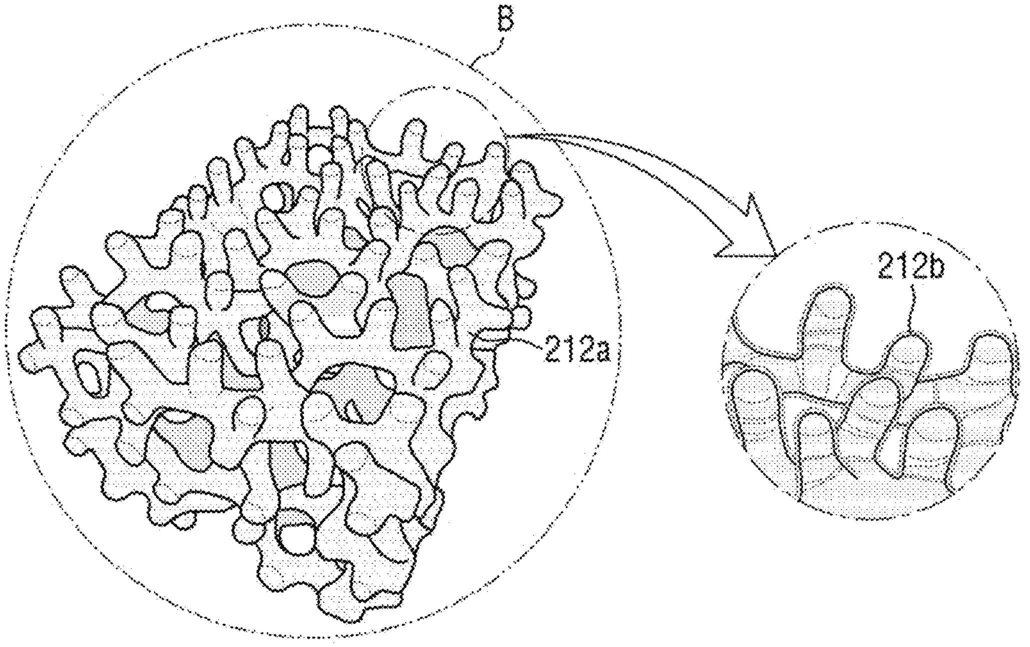
FIG. 8 is an enlarged view of portion B of a soft coating layer of FIG. 7.

FIG. 7 is a cross-sectional view of the soft coating layer 212. FIG. 8 is an enlarged view of portion B of the soft coating layer 212 of FIG. 7.

Referring to FIG. 7, in an embodiment, the soft coating layer 212 includes a conductive polymer layer 212*a*, a silica coating layer 212*b* disposed on the conductive polymer layer 212*a*, and a cover layer 212*c* disposed on the silica coating layer 212*b*.

The conductive polymer layer 212*a* includes a backbone of a conductive polymer that has a three-dimensional nanostructure and a linker, such as a urethane-acrylic-based linker, an acrylic-based linker, or an epoxy-based linker, and may be formed as a single layer or as multiple layers.

In an embodiment, the conductive polymer layer 212*a* includes a conductive polymer, such as one of a polythiophene-based compound, a polypyrrole-based compound, a polyaniline-based compound, a polyacetylene-based compound, a polyphenylenether-based compound, and a mixture thereof. For example, the conductive polymer layer 212*a* includes a polyaniline-based compound. In an embodiment, the conductive polymer layer 212*a* includes at least one of polyaniline, polymethylaniline, and polymethoxyaniline, etc. The conductive polymer as described above is easy to manufacture and is highly flexible, and hence the stretchability of the soft coating layer 212 can be improved and to the possibility of cracks occurring when bending can be reduced.

The silica coating layer 212*b* is disposed on the conductive polymer layer 212*a*.

In an embodiment, the silica coating layer 212*b* is formed on the conductive polymer layer 212*a* by coating silica nano particles 212*b_s* on the surface of the conductive polymer layer 212*a*. Accordingly, the silica coating layer 212*b* is disposed on at least one side of the conductive polymer layer 212*a*.

The silica coating layer 212*b* includes the silica nano particles 212*b_s*. The silica nano particles 212*b_s* of the silica coating layer 212*b* are spherical particles of which the inside is fully filled. For example, the silica nano particles 212*b_s* are silica nano particles with a predetermined interior diameter and in which the interior is entirely filled with a silica material.

The silica nano particles 212*b_s* have a higher elastic modulus and higher hardness than a silica nano particle of which the inside is an empty space.

The silica coating layer 212*b* includes silica nano particles 212*b_s* having different exterior diameters. However, embodiments of the disclosure are not necessarily limited thereto, and in an embodiment, each of the silica nano particles 212*b_s* of the silica coating layer 212*b* have the same exterior diameter.

In an embodiment, the silica coating layer 212*b* is formed by coating a binder that contains the silica nano particles 212*b_s* on the conductive polymer layer 212*a*. The silica coating layer 212*b* includes the silica nano particles 212*b_s* distributed on an upper surface of the conductive polymer layer 212*a* and the binder that binds the silica nano particles 212*b_s*.

As described above, since the silica coating layer 212*b* includes silica nano particles 212*b_s* having high elastic modulus and the high hardness and a highly fluidic binder, an external impact applied to the silica coating layer 212*b* is first applied to the silica nano particles 212*b_s*. Then, the impact applied to the silica nano particles 212*b_s* is absorbed and/or dispersed by the binder.

Thus, the degree to which an external impact applied to the silica coating layer 212*b* is transferred to the layers disposed under the silica coating layer 212*b* is reduced, and the impact-resistance of the soft coating layer 212 is increased by the silica coating layer 212*b*.

Referring to FIG. 8, in an embodiment, the conductive polymer layer 212*a* has a three-dimensional shape that extends in different three-dimensional directions, and includes a plurality of protrusions that protrude (or extend) outward from an end (or one side) of the conductive polymer layer 212*a*.

In an embodiment, each protrusion protrudes in a different direction, such that the protrusions form a three-dimensional shape that is an uneven structure on the surface of the conductive polymer layer 212*a*.

With the uneven structure formed on the surface of the conductive polymer layer 212*a*, the surface contact angle of the conductive polymer layer 212*a* is increased. For example, a contact area between the surface of the conductive polymer layer 212*a* and a material in contact with the surface of the conductive polymer layer 212*a* is reduced and a hydro-repellent property is increased.

In addition, the conductive polymer layer 212*a* includes voids formed between the conductive polymers. With the voids in the conductive polymer layer 212*a*, stretchability in a horizontal direction and stretchability with respect to a vertically applied external force is increased, which can minimize cracking caused by repeated folding.

Referring back to FIG. 7, the cover layer 212*c* is disposed on the silica coating layer 212*b*. For example, the cover layer 212*c* may be disposed on at least one side of the silica coating layer 212*b*.

For example, after applying a soft-coating composition solution SCP (see, e.g., FIG. 14) on the silica coating layer 212*b*, the cover layer 212*c* is formed on one side of the silica coating layer 212*b* through UV curing or thermal curing. A detailed description of a method of forming the cover layer 212*c* on the silica coating layer 212*b* will be provided below.

The cover layer 212*c* includes an organic layer and an organic-inorganic composite layer. The organic layer includes an acrylate-based compound.

An organic material in the organic-inorganic composite layer includes at least one of an acrylate-based compound, a polyurethane-based compound, an epoxy-based compound, a carboxylic acid-based compound, and a maleimide-based compound. For example, first and second organic-inorganic composite layers include urethane acrylate.

An inorganic material in the organic-inorganic composite layer is at least one of silicon oxide ($SiO_2$), zirconium oxide ($ZrO_2$), aluminum oxide ($Al_2O_3$), tantalum oxide ($Ta_2O_5$), and niobium oxide ($Nb_2O_5$ or $NbO_2$), or is a glass bead.

The inorganic material may be provided in the form of a single listed inorganic oxide or a combination of these materials. In addition, the inorganic material can be provided in various forms to form the organic-inorganic composite layer. For example, silicon oxide may be provided in the form of $SiO_2$ particles, an $SiO_2$ solution in which $SiO_2$ particles are dispersed in a colloidal state, or $SiO_2$ having a hollow shape.

In the organic-inorganic composite layer, an acrylate compound, which is an organic material, and the inorganic particles are mixed in a weight ratio of 5:5 to 8:2. As the cover layer 212*c* includes both the acrylate compound and the inorganic particles, the soft coating layer 212 has increased surface hardness and can absorb external shocks and be highly stretchable.

The soft coating layer 212 further haves an antistatic function. When the soft coating layer 212 includes an antistatic function, dust in the air does not readily attach to the soft coating layer 212 and a stain can be prevented when the display device 10 (see, e.g., FIG. 4) is used.

A method for imparting the antistatic function to the soft coating layer 212 includes adding an antistatic agent, but embodiments are not necessarily limited thereto. For example, in an embodiment, a conductive material is added to metal oxide particles to impart the antistatic function. The conductive material is, for example, one of antimony (Sb) and phosphorus (P). Examples of the metal oxide particles to which the conductive material is added include antimony tin oxide (ATO) or phosphorus tin oxide (PTO).

In addition, the conductive material is not limited to one material, and may include two or more conductive materials. Consequently, a surface resistance value of the soft coating layer 212 can be lowered, and the soft coating layer 212 is imparted with an antistatic function.

The soft coating layer 212 further includes an additive to increase the stretchability of the soft coating layer 212.

Examples of the additives include at least one of 1,6-Hexaneciol diacrylate (HDDA), 1,10-Decanediol diacrylate (DDDA), bisphenol A (EO)4 diacrylate (BPA(EO)4DA), bisphenol A (EO)3 diacrylate (BPA(EO)3DA), bisphenol A (EO)10 diacrylate (BPA(EO)10DA), bisphenol A (EO)20 diacrylate (BPA(EO)20DA), bisphenol A (EO)30 diacrylate (BPA(EO)30DA), tricylclodecane dimethanol diacrylate (TCDDA), polyethylene glycol 400 diacrylate (PEG400DA), polyethylene glycol 300 diacrylate (PEG300DA), polyethylene glycol 200 diacrylate (PEG200DA), polyethylene glycol 600 diacrylate (PEG600DA), bisphenol F(EO)4 diacrylate (BPF(EO)4DA), and polypropylene glycol 400 diacrylate (PPG400DA).

In an embodiment, a thickness of the soft coating layer 212 is from 300 nm to 500 nm and has a strain of 30% or more. However, embodiments of the disclosure are not necessarily limited thereto.

When the thickness of the soft coating layer 212 is 300 nm or more, the surface hardness is sufficiently increased. In addition, when the thickness of the soft coating layer 212 is 500 nm or less, an increase in the repulsive force with respect to the deformation of the soft coating layer 212 is suppressed, thereby preventing cracks that occur in the soft coating layer 212 due to repeated folding.

In addition, the soft coating layer 212 has a higher modulus than the base layer 211. The soft coating layer 212 according to an embodiment has a modulus of from 500 MPa to 2 GPa. However, embodiments of the disclosure are not necessarily limited thereto.

When the physical properties of the soft coating layer 212 are within the above ranges, the window protective film 210 (see, e.g., FIG. 6) has excellent wear resistance and chemical resistance.

The anti-fingerprint coating layer 213 (see, e.g., FIG. 6) is disposed on the soft coating layer 212. The window protective film 210 is exposed to the outside of the display device 10 and can be touched by a user's finger. For example, the surface of the window protective film 210 is used as a touch side for a touch sensor. Since the desired anti-fingerprint characteristics might not be achieved with only the soft coating layer 212, the anti-fingerprint coating layer 213 is disposed on the soft coating layer 212, thereby increasing resistance characteristics, such as wear resistance and chemical resistance.

The anti-fingerprint coating layer 213 includes an acrylate-based compound and a fluorine-based additive. For example, the anti-fingerprint coating layer 213 includes a fluorine-containing silane compound in which a silane portion and a fluorinated carbon portion are linked by an alkyl chain.

In an embodiment, the thickness of the anti-fingerprint coating layer 213 is from 20 nm to 100 nm. When the thickness of the anti-fingerprint coating layer 213 is less than 20 nm, the anti-fingerprint function of the anti-fingerprint coating layer 213 may deteriorate. In addition, when the thickness of the anti-fingerprint coating layer 213 is greater than 100 nm, the reflectance changes and the optical properties may deteriorate.

In an embodiment, the anti-fingerprint coating layer 213 includes a fluorine-containing silane compound represented by the following Formula 1:

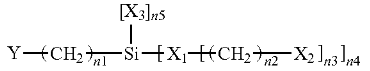

In Formula 1, $X_1$ to $X_3$ are each independently one of a substituted or unsubstituted amine group, a methoxy group, a hydroxyl group, dimethyl monoalkoxysilane, monometal dialkoxysilane, trialkoxysilane, silazane, ethylene glycol, triethylene glycol, mercapto, ester, alkoxy, methacrylic, acrylic, carboxylic acid, cyclic amine, epoxy, fluorocarbon, azide, benzophenone, isocyanate, hydrogen, and a combination thereof, and n1 to n5 are each independently an integer from 1 to 10.

In Formula 1, Y is a fluorine compound that contains fluorinated carbon. In one embodiment, Y in Formula 1 is perfluoropolyether (PFPE), as expressed by the following Formula 2:

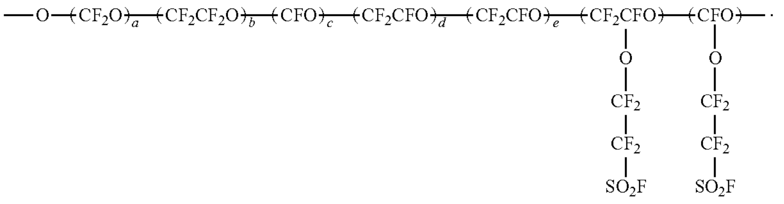

Formula 2 is a representative structural diagram of perfluoropolyether (PFPE). In Formula 2, a, b, c, d, and e are each independently an integer from 1 to 10. However, the structure of perfluoropolyether (PFPE) is not necessarily limited to Formula 2 above.

In an embodiment, although Y in Formula 1 is perfluoropolyether (PFPE), embodiments of the disclosure are not necessarily limited thereto, and in an embodiment, Y is one of polytetrafluoroethylene (PTFE), fluorinated ethylene propylene (FEP), and perfluoroalkyl vinyl ether copolymer.

In Formula 1, the fluorine-containing silane compound is linear as a whole, and has, at the respective terminals thereof, a perfluoropolyether (PFPE) and an anchoring group in a fluorinated carbon portion, and a linking group positioned between the perfluoropolyether (PFPE) and the anchoring group.

Accordingly, the fluorine-containing silane compound is aligned in one direction due to the difference in surface energy at both terminals. For example, the perfluoropolyether (PFPE) is aligned toward the outside of the soft coating layer 212 and the anchoring group is aligned while being bonded to the surface of the soft coating layer 212.

In the fluorine-containing silane compound of Formula 1, the average molecular weight of the fluorine-containing (poly)ether group ranges from 2,000 g/mol to 20,000 g/mol, and the average molecular weight of the anchoring group ranges from 1,000 g/mol to 10,000 g/mol.

In an embodiment, the fluorine-containing silane compound of Formula 1 has an average molecular weight of from 3,000 g/mol to 30,000 g/mol. The anti-fingerprint coating layer 213 that contains the fluorine-containing silane compound that has the average molecular weight in the above range has increased durability.

In Formula 1 above, the amine groups that can be substituted or unsubstituted for $X_1$ to $X_3$ have high reactivity, so that the bonding strength between the fluorine-containing silane compound and the soft coating layer 212 can be increased.

Formula 3

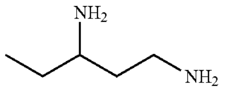

Formula 4

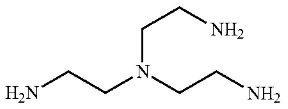

In an embodiment, due to the amine groups that are substituted or unsubstituted for $X_1$ to $X_3$, the fluorine-containing silane compound has a terminal group structure of a diamine structure that has two amine groups as shown in Formula 3 or a triamine structure that has three amine groups as shown in Formula 4. Accordingly, the adhesion of the anchoring group is increased.

However, embodiments of the disclosure are not necessarily limited thereto. For example, in an embodiment, a terminal group of the anchoring group has a terminal group structure that contains at least one of a hydroxyl group, dimethyl monoalkoxysilane, monometal dialkoxysilane, trialkoxysilane, silazane, ethylene glycol, triethylene glycol, mercapto, ester, alkoxy, methacrylic, acrylic, carboxylic acid, cyclic amine, epoxy, fluorocarbon, azide, benzophenone, isocyanate, and hydrogen, etc.

Hereinafter, other embodiments will be described. In the following descriptions, like reference numerals may be used for like elements that correspond to those of embodiments described above and repeated descriptions thereof may by omitted or summarized.

Figure 9:
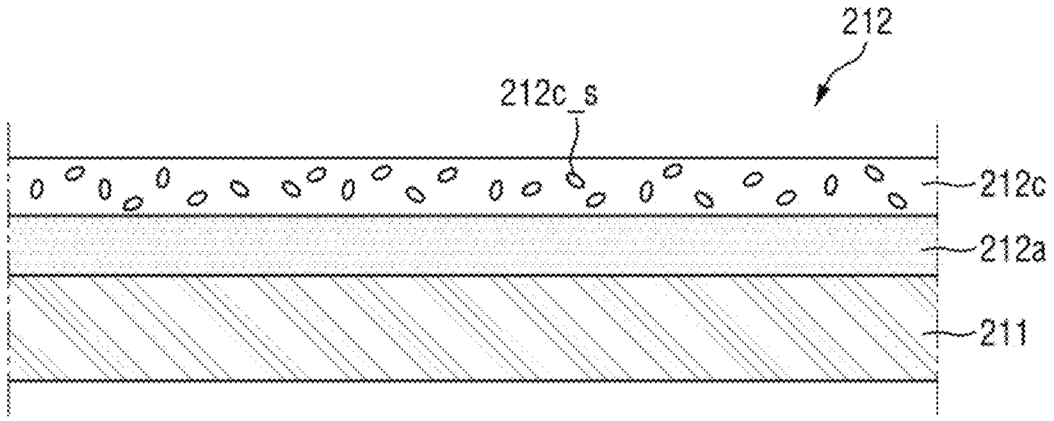
FIG. 9 is a cross-sectional view of a soft coating layer according to an embodiment of the disclosure.

FIG. 9 is a cross-sectional view of a soft coating layer 212 according to an embodiment of the disclosure.

Referring to FIG. 9, a soft coating layer 212 according to an embodiment differs from an embodiment described above with reference to FIG. 7 in that a silica coating layer 212*b* disposed on a conductive polymer layer 212*a* is omitted and a cover layer 212*c* that includes silica nano particles 212*c_s* is disposed directly on the conductive polymer layer 212*a*.

In an embodiment, the cover layer 212*c* includes silica nanoparticles 212*c_s* having the high hardness and high elastic modulus and the highly fluidic binder described above and is directly coated on the conductive polymer layer 212*a* that has a three-dimensional nanostructure.

According to an embodiment, the soft coating layer 212 has increased impact resistance due to the silica nano particles 212*c_s* in the cover layer 212*c*, and external impacts applied to the soft coating layer 212 are absorbed and/or distributed by the silica nano particles 212*c_s*. In addition, the silica coating layer 212*b* (see, e.g., FIG. 7) is omitted, thereby reducing the thickness of the soft coating layer 212 and thus increasing elongation.

Figure 10:
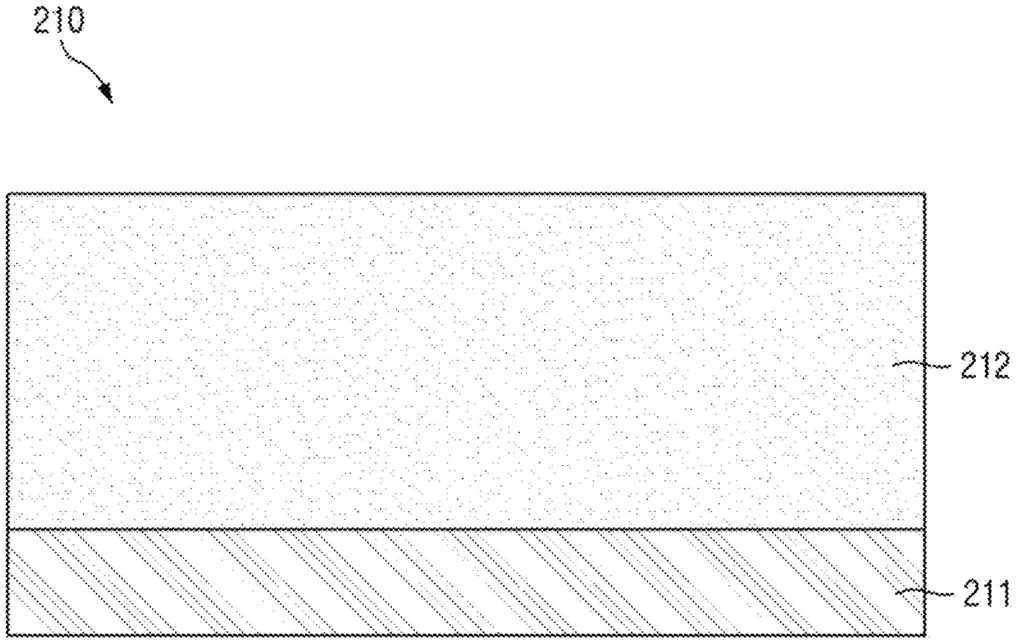
FIG. 10 is a cross-sectional view of a window protective film according to an embodiment of the disclosure.
Figure 11:
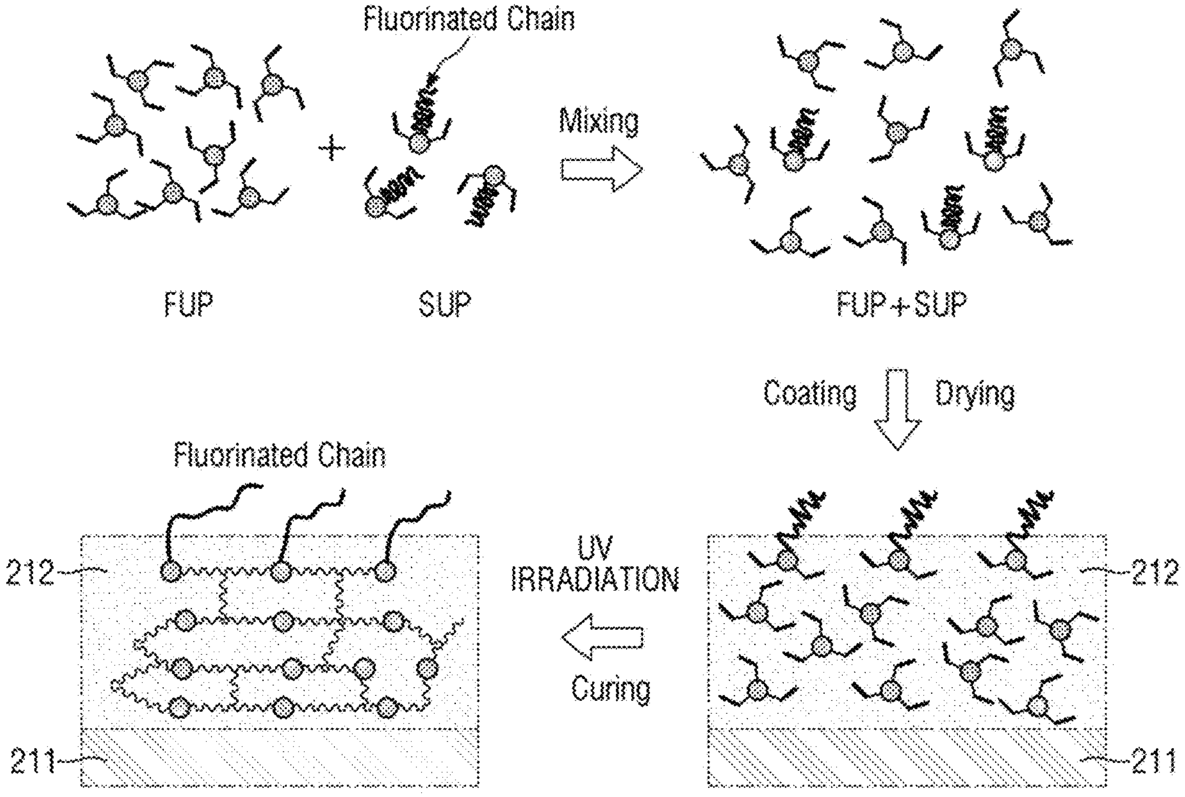
FIG. 11 illustrates a fabricating process of a window protective film according to an embodiment of the disclosure.

FIG. 10 is a cross-sectional view of a window protective film 210 according to an embodiment of the disclosure. FIG. 11 illustrates a fabricating process of a window protective film 210 according to an embodiment of the disclosure.

Referring to FIG. 10, a window protective film 210 according to an embodiment differs from an embodiment described above with reference to FIG. 6 in that an anti-fingerprint coating layer 213 disposed on a soft coating layer 212 is omitted and the soft coating layer 212 further includes a fluorine-based polymer and has an anti-fingerprint characteristic.

When the soft coating layer 212 that has high hardness and modulus characteristics and the anti-fingerprint coating layer 213 (see, e.g., FIG. 6) that has anti-fingerprint characteristics are separately disposed, as the display device 10 (see, e.g., FIG. 4) is repeatedly folded and unfolded, bonding between these layers may weaken, or stains may remain due to damage to the anti-fingerprint layer.

To address this situation, in the window protective film 210 according to an embodiment, the soft coating layer 212 disposed on the base layer 211 has high hardness and modulus properties, and is formed as a single layer in which anti-fingerprint components are mixed.

The window protective film 210 according to an embodiment includes the base layer 211 and the soft coating layer 212 disposed on the base layer 211.

Referring to FIG. 11, in an embodiment, the soft coating layer 212 is formed by applying a solution in which first unit polymers FUP that form a polymer that has specific hardness and modulus ranges are mixed with second unit polymers SUP that form an anti-fingerprint polymer, dying the solution, and then curing the solution with UV irradiation.

When the first unit polymers FUP and the second unit polymers SUP are cured to form a polymer chain, the second unit polymers SUP that form the anti-fingerprint polymer are polymerized on the surface of the soft coating layer 212, and are crosslinked with the polymer formed by the first unit polymers FUP.

In some embodiments, the second unit polymers SUP include a fluorine-based polymer to have anti-fingerprint characteristics. In addition, in some embodiments, the solution in which the first unit polymers FUP and the second unit polymers SUP are mixed further includes a solvent and a crosslinking agent, and also includes a photoinitiator.

The atomic ratio of fluorine (F) in the second unit polymer SUP formed on the surface of the soft coating layer 212 is determined depending on the crosslink density between the polymers formed by the first unit polymers FUP and the second unit polymers SUP. The crosslink density is controlled by the content of the added crosslinking agent. In an embodiment, the hardness, modulus, wear resistance, and chemical resistance of the soft coating layer 212 varies depending on the crosslink density between polymers.

In addition, a plurality of protrusions that protrude outward from one end of a conductive polymer layer 212*a* (see, e.g., FIG. 8) in the soft coating layer 212 form an uneven structure. With the uneven structure, the surface contact angle of the soft coating layer 212 is large, which increases a hydro-repellent property and maintains wear-resistant surface characteristics.

Hereinafter, a method of fabricating a window protective film 210 will be described with reference to FIGS. 12 to 16.

Figure 12:
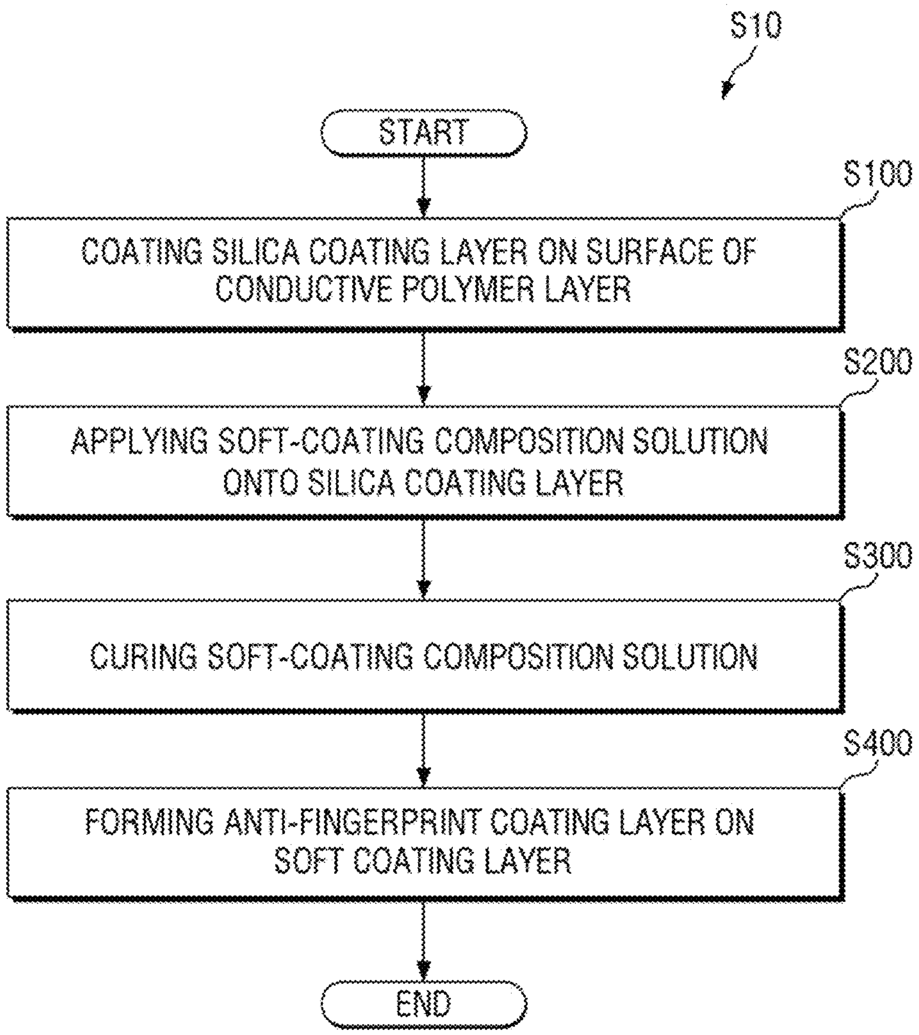
FIG. 12 is a flowchart of a method of fabricating a window protective film according to an embodiment of the disclosure.

FIG. 12 is a flowchart of a method of fabricating a window protective film 210 (see, e.g., FIG. 16) according to an embodiment of the disclosure. FIGS. 13 to 16 illustrate steps of a method of fabricating a window protective film 210 according to an embodiment of the disclosure.

Referring to FIGS. 6, 7 and 12, in an embodiment, a method S10 of fabricating a window protective film 210 includes a step S100 of coating a silica coating layer 212*b* on a surface of a conductive polymer layer 212*a*, a step S200 of applying a soft-coating composition solution SCP onto the silica coating layer 212*b*, a step S300 of curing the soft-coating composition solution SCP, and a step S400 of forming an anti-fingerprint coating layer 213 on the soft coating layer 212.

A method of fabricating a window protective film 210 is not necessarily limited to the above example, and at least some of the steps may be omitted or at least one step may be further included with reference to other embodiments.

Hereinafter, a method of fabricating a window protective film 210 will be described in detail with reference to FIGS. 13 to 16.

Figure 13:
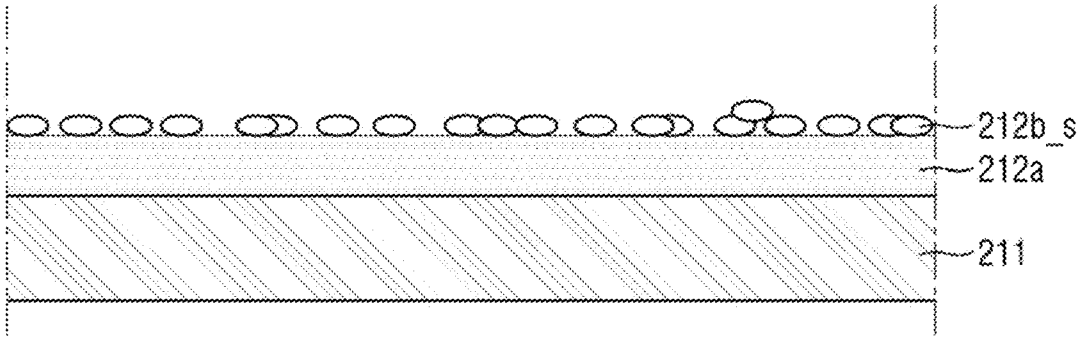
FIGS. 13 to 16 illustrate steps of a method of fabricating a window protective film according to an embodiment of the disclosure.

Referring to FIG. 13, in an embodiment, the step S100 (see FIG. 12) of coating the silica coating layer 212*b* (see, e.g., FIG. 14) on the surface of the conductive polymer layer 212*a* further includes preparing the base layer 211 and forming a conductive polymer layer 212*a* on one surface of the base layer 211.

Before the silica coating layer 212*b* is coated, the conductive polymer layer 212*a* is attached onto one surface of the base layer 211.

The silica coating layer 212*b* is formed through hydrolysis and condensation reaction of a silica oxide precursor material. For example, the silica coating layer 212*b* is formed by mixing a silica oxide precursor material, a catalyst material, and water in an organic solvent and growing silica nanoparticles 212*b_s* on the surface of the conductive polymer layer 212*a*.

Examples of the silica oxide precursor material include triethoxysilane (HTEOS), tetraethoxysilane (TEOS), methyltriethoxysilane (MTEOS), dimethyldiethoxysilane, tetramethoxysilane (TMOS), methyltrimethoxysilane (MTMOS), trimethoxysilane, dimethyldimethoxysilane, phenyltriethoxysilane (PTEOS), phenyltrimethoxysilane (PTMOS), diphenyldiethoxysilane, or diphenyldimethoxysilane, etc. However, embodiments of the disclosure are not necessarily limited thereto.

Examples of the organic solvent include an alcoholic solvent such as methanol, ethanol, propanol, butanol, pentanol, hexanol, methyl cellosolve, butyl cellosolve, propylene glycol, diethylene glycol, or toluene. These organic solvents may be used alone or in a combination thereof. However, embodiments of the disclosure are not necessarily limited thereto.

As the catalyst material, an alkaline material, such as ammonia (NH3), can be used. Ammonia is used as a catalyst material in a process of forming the silica coating layer 212*b* by mixing aqueous ammonia (NHOH) with the organic solvent. However, embodiments of the disclosure are not necessarily limited thereto.

Figure 14:
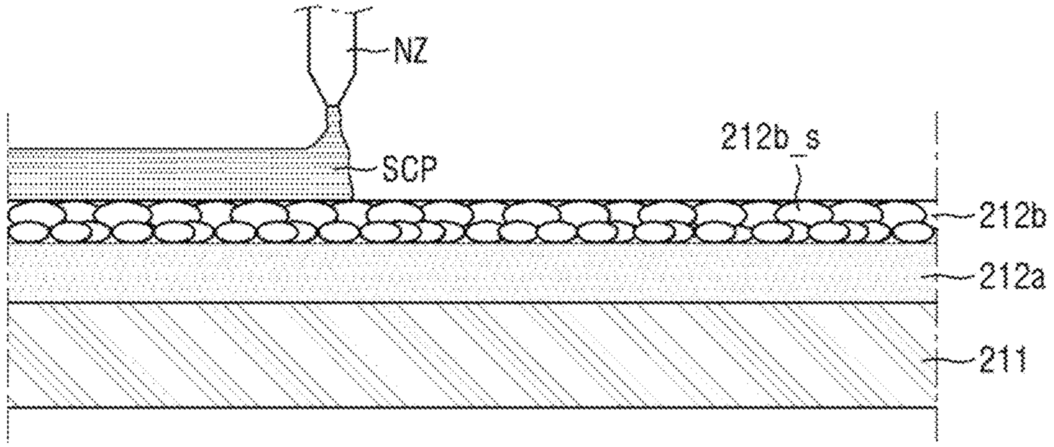
Figure 15:
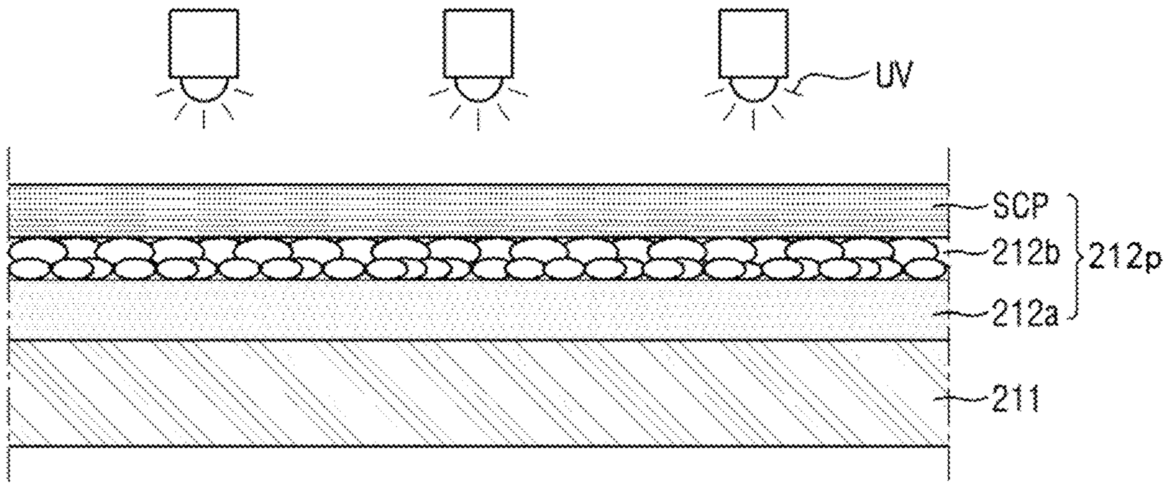
Figure 16:
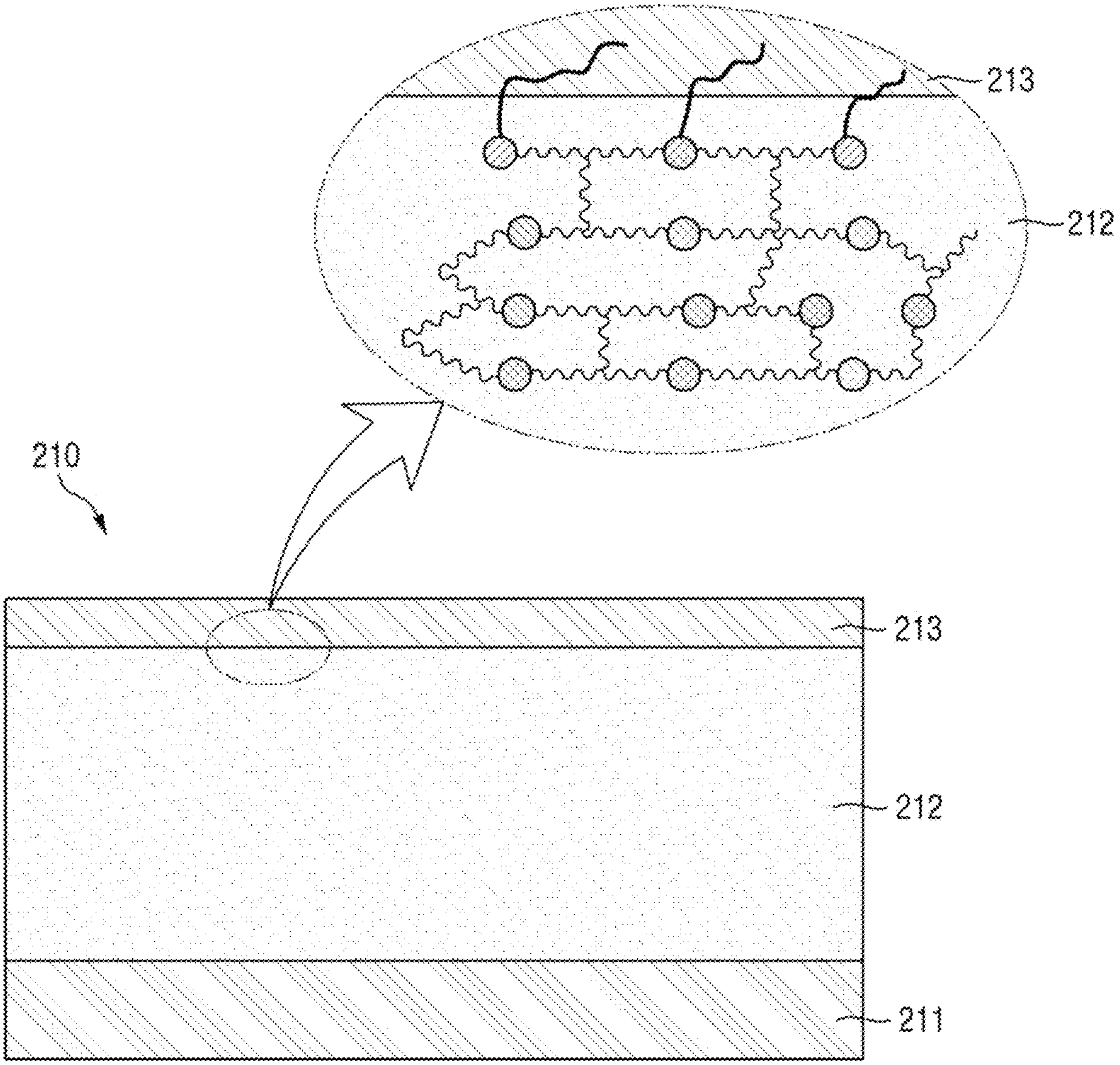

Referring to FIGS. 14 and 15, in an embodiment, the soft-coating composition solution SCP is applied onto the silica coating layer 212*b*, and then cured to form the soft coating layer 212 (see, e.g., FIG. 16). As shown in FIG. 14, the soft-coating composition solution SCP is applied onto the silica coating layer 212*b*. According to some embodiments, the soft-coating composition solution SCP includes an antistatic agent, a nano silica sol, a light-transmitting resin, a photoinitiator, and a solvent.

The solvent may be used without limitations in its composition as long as the composition dissolves or disperses components of the soft-coating composition solution SCP. For example, the solvent includes one or more of an alcohol, such as methanol, ethanol, isopropanol, butanol, or propylene glycol methoxy alcohol, etc., a ketone, such as methyl ethyl ketone, methyl butyl ketone, methyl isobutyl ketone, diethyl ketone, or dipropyl ketone, etc., an acetate, such as methyl acetate, ethyl acetate, butyl acetate, or propylene glycol methoxy acetate, etc., a cellosolve, such as methyl cellosolve, ethyl cellosolve, or propyl cellosolve, etc., and a hydrocarbon, such as normal hexane, normal heptane, benzene, toluene, or xylene, etc.

FIG. 14 illustrates that the soft-coating composition solution SCP is applied using a nozzle NZ coating method, but embodiments of the disclosure are not necessarily limited thereto. For example, in embodiments, the coating of the soft-coating composition solution SCP uses well-known processes such as slit coating, knife coating, spin coating, casting, micro-gravure coating, gravure coating, bar coating, roll coating, wire bar coating, dip coating, spray coating, screen printing, gravure printing, flexographic printing, offset printing, inkjet coating, dispenser printing, or capillary coating.

Referring to FIG. 15, a preliminary soft coating layer 212*p* is formed by applying the soft-coating composition solution SCP onto the silica coating layer 212*b*. In the step S300 (see, FIG. 12) of curing the soft-coating composition solution SCP, the preliminary soft coating layer 212*p* is cured to form the soft coating layer 212. The soft-coating composition solution SCP is cured by irradiating ultraviolet (UV) light onto the soft-coating composition solution SCP. However, embodiments of the disclosure are not necessarily limited thereto.

Referring to FIG. 16, in an embodiment, a coating material that includes perfluoropolyether is applied onto the soft coating layer 212 using a spray coating method. However, a method of applying the coating material that includes perfluoropolyether is not necessarily limited to an above method, and the same method as that of applying the soft-coating composition solution SCP described above can be used.

The coating material, which includes perfluoropolyether, is applied and dried, and then thermally cured or UV cured at approximately 60° C. for about 60 minutes to form the anti-fingerprint coating layer 213. However, a curing method is not necessarily limited thereto.

In an embodiment, the coating material that includes perfluoropolyether forms a polymer chain while cross-linking in the soft coating layer 212 through thermal curing or UV curing. An anchoring group in the coating material is cross-linked on the surface of the soft coating layer 212, and the fluorinated carbon portion is cross-linked while being arranged in an outward direction of the soft coating layer 212.

Accordingly, the atomic ratio of fluorine (F) in the anti-fingerprint coating layer 213 increases from a lower surface to an upper surface of the anti-fingerprint coating layer 213. The lower surface of the anti-fingerprint coating layer 213 is in contact with the soft coating layer 212 and the upper surface faces the lower surface. The anti-fingerprint coating layer 213 is formed using various methods without necessarily being limited to an above-described method.

Through an above process, the window protective film 210 formed on the window 220 (see, e.g., FIG. 4) has a constant hardness and modulus to provide high stretchability and to maintain wear-resistant surface characteristics, which protects the window 220 and other stacked layers.

Figure 17:
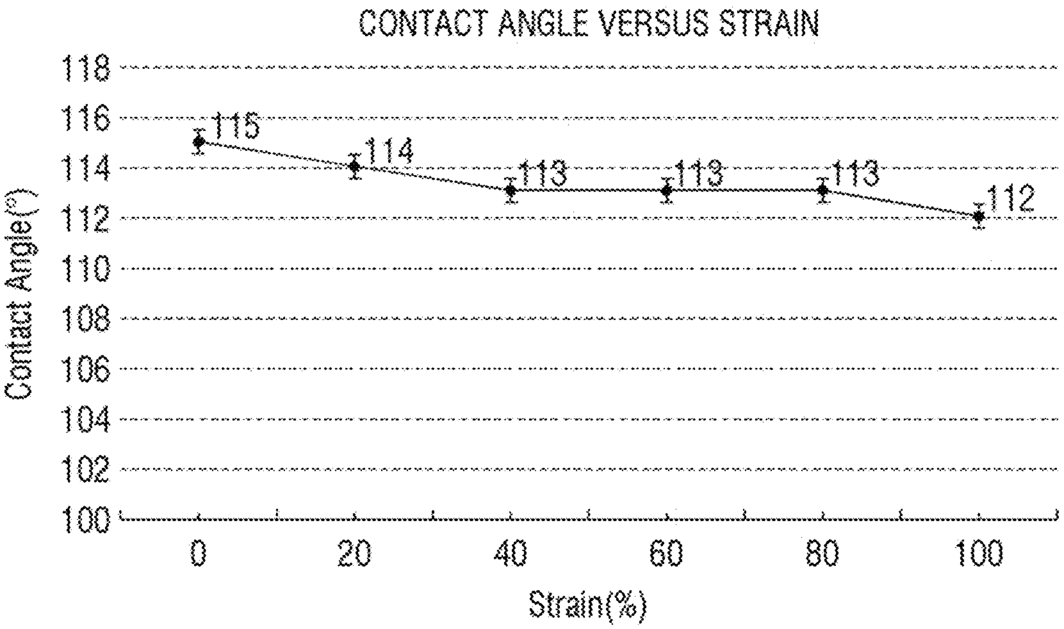
FIG. 17 is a graph of a contact angle as a function of strain evaluation for a conductive polymer.
Figure 18:
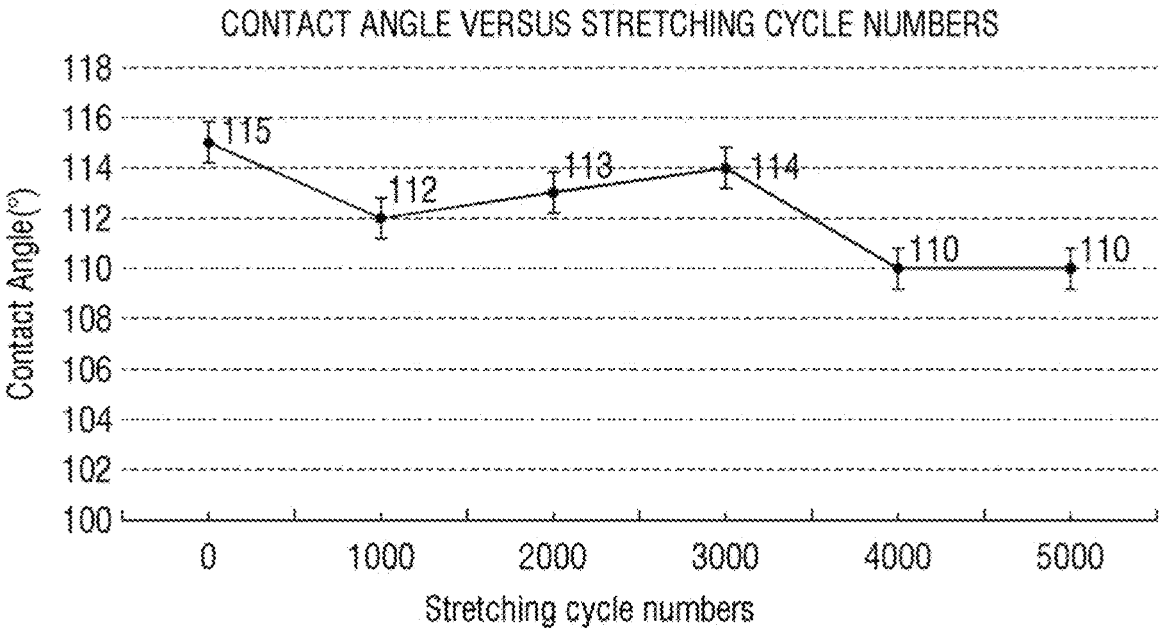
FIG. 18 is a graph of a contact angle as a function of stretching repetition tests for a conductive polymer.

FIG. 17 is a graph of a contact angle as a function of strain evaluation for a conductive polymer. FIG. 18 is a graph of a contact angle as a function of a stretching repetition test for a conductive polymer.

The graph of FIG. 17 shows a result of the surface contact angle as a function of strain of polyaniline, which is one type of conductive polymer material.

Referring to FIG. 17, the vertical axis represents the contact angle, and the horizontal axis represents a strain. The graph shown in FIG. 17 shows the correlation between the variables described above, and is thus not necessarily limited to the specific numerical values listed therein.

Referring to FIG. 17, when a strain is 0%, that is, when polyaniline maintains its original shape without change due to external force, an initial surface contact angle is approximately 115 degrees. Then, when the strain of polyaniline increases from 20% to 100%, the surface contact angle decreases from 114 degrees to 112 degrees. When the strain is 30% or more, the contact angle of polyaniline maintains approximately 113 degrees or less.

Accordingly, as a difference between the initial surface contact angle measured when the strain of polyaniline is 0% and the surface contact angle measured when the strain is 30% or more is maintained at approximately 3 degrees or less, the strain of polyaniline has a value of 30% or more. Thus, the conductive polymer material has excellent stretchability and durability.

The graph of FIG. 18 shows the result of the surface contact angle as a function of the number of stretching cycle of polyaniline, which is one type of conductive polymer material.

Referring to FIG. 18, the vertical axis represents the contact angle, and the horizontal axis represents the number of stretching cycles. The graph shown in FIG. 18 shows the correlation between the variables described above, and is thus not necessarily limited to the specific numerical values listed therein.

Referring to FIG. 18, when a stretching cycle is not applied to polyaniline, an initial surface contact angle has a value of approximately 115 degrees as shown in FIG. 17. Then, when the number of stretching cycle of polyaniline is 1000 or more, the surface contact angle has a value of approximately 110 degrees to 114 degrees, and when the number of of stretching cycle is 4000 or more, the surface contact angle of polyaniline is maintained at approximately 110 degrees or more.

For example, a difference between the initial surface contact angle measured when stretching cycle is not performed for polyaniline and the surface contact angle measured when the stretching cycle is performed 5000 times is maintained at approximately 5 degrees or less, and thus it can be seen that polyaniline is not damaged even after the display device is folded and unfolded many times.

Therefore, referring to the results shown in the graphs of FIGS. 17 and 18, since the conductive polymer layer 212*a* (see, e.g., FIG. 15) in the soft coating layer 212 (see, e.g., FIG. 16) includes a conductive polymer material such as polyaniline, the soft coating layer 212 can maintain a strain of 30% or more.

As a result, defects such as cracks that may occur in some layers of the display device 10 when the display device 10 (see, e.g., FIG. 4) is repeatedly folded and unfolded are prevented, thereby increasing the reliability of the display device 10.

In concluding the detailed description, those skilled in the art will appreciate that many variations and modifications can be made to embodiments without substantially departing from the principles of the inventive concept. Therefore, embodiments of the disclosure are used in a generic and descriptive sense only and not for purposes of limitation.

What is claimed:

1. A window protective film, comprising:
a base layer;
a soft coating layer disposed on the base layer; and
an anti-fingerprint coating layer disposed on the soft coating layer,
wherein the soft coating layer comprises
a conductive polymer layer disposed on and in contact with a first surface of the base layer,
a silica coating layer disposed on at least one side of the conductive polymer layer and that includes a plurality of silica nano particles, and
a cover layer disposed on at least one side of the silica coating layer,
wherein an entirety of the cover layer is separated from the conductive polymer layer by the silica coating layer.

2. The window protective film of claim 1, wherein the conductive polymer layer comprises a plurality of protrusions that extend outward from one side of the conductive polymer layer, and a plurality of voids.

3. The window protective film of claim 1, wherein the base layer comprises at least one of
a polyether block amide-based polymer,
a silicone-based polymer, and
a urethane-based polymer.

4. The window protective film of claim 1, wherein a thickness of the base layer is from 70 μm to 100 μm.

5. The window protective film of claim 1, wherein the conductive polymer layer comprises at least one of
a polythiophene-based compound,
a polypyrrole-based compound,
a polyaniline-based compound,
a polyacetylene-based compound, and
a polyphenylenether-based compound.

6. The window protective film of claim 1, wherein a modulus of the soft coating layer is from 500 MPa to 2 GPa.

7. The window protective film of claim 1, wherein the soft coating layer comprises an organic material and an inorganic material, wherein
the organic material comprises at least one of
an acrylate-based compound,
a polyurethane-based compound,
an epoxy-based compound,
a carboxylic acid-based compound, and
a maleimide-based compound, and
the inorganic material comprises at least one of
silicon oxide ($SiO_2$),
zirconium oxide ($ZrO_2$),
aluminum oxide ($Al_2O_3$),
tantalum oxide ($Ta_2O_5$),
niobium oxide ($Nb_2O_5$ or $NbO_2$),
glass bead,
antimony (Sb),
phosphorus (P),
antimony tin oxide (ATO), and
phosphorus tin oxide (PTO), or
the inorganic material is glass bead.

8. The window protective film of claim 1, wherein the anti-fingerprint coating layer comprises a fluorine-containing silane compound represented by the following Formula 1:

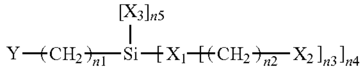

wherein in Formula 1, $X_1$ to $X_3$ is each independently one of
a substituted or unsubstituted amine group,
a methoxy group,
a hydroxyl group,
dimethyl monoalkoxysilane,
monometal dialkoxysilane,
trialkoxysilane,
silazane,
ethylene glycol,
triethylene glycol,
mercapto,
ester,
alkoxy,
methacrylic,
acrylic,
carboxylic acid,
cyclic amine,
epoxy,
fluorocarbon,
azide,
benzophenone,
isocyanate,
hydrogen, and
a combination thereof,
Y is one of
perfluoropolyether (PFPE),
polytetrafluoroethylene (PTFE),
fluorinated ethylene propylene (FEP), and
perfluoroalkyl vinyl ether copolymer, and
n1 to n5 are each independently an integer from 1 to 10.

9. The window protective film of claim 1, wherein a thickness of the soft coating layer is from 300 nm to 500 nm.

10. The window protective film of claim 1, wherein the soft coating layer comprises an additive, and the additive comprises at least one of
1,6-Hexaneciol diacrylate (HDDA),
1,10-Decanediol diacrylate (DDDA),
bisphenol A (EO)4 diacrylate (BPA(EO)4DA),
bisphenol A (EO)3 diacrylate (BPA(EO)3DA),
bisphenol A (EO)10 diacrylate (BPA(EO)10DA),
bisphenol A (EO)20 diacrylate (BPA(EO)20DA), bisphenol A (EO)30 diacrylate (BPA(EO)30DA),
tricyclodecane dimethanol diacrylate (TCDDA),
polyethylene glycol 400 diacrylate (PEG400DA),
polyethylene glycol 300 diacrylate (PEG300DA),
polyethylene glycol 200 diacrylate (PEG200DA),
polyethylene glycol 600 diacrylate (PEG600DA),
bisphenol F(EO)4 diacrylate (BPF(EO)4DA), and
polypropylene glycol 400 diacrylate (PPG400DA).

11. The window protective film of claim 1, wherein a thickness of the anti-fingerprint coating layer is from 20 nm to 100 nm.

12. An electronic device, comprising:
a display device, wherein the display device comprises:
a display panel that includes one surface located at front of the display panel; and
a front stacked structure on the one surface of the display panel,
wherein the front stacked structure comprises a window and a window protective film attached onto the window,
wherein the window protective film comprises
a base layer,
a soft coating layer disposed on the base layer, and
an anti-fingerprint coating layer disposed on the soft coating layer,
wherein the soft coating layer comprises
a conductive polymer layer disposed on and in contact with a first surface of the base layer,
a silica coating layer disposed on at least one side of the conductive polymer layer and that includes a plurality of silica nano particles, wherein an entirety of the silica coating layer is separated from the base layer by the conductive polymer layer, and
a cover layer disposed on at least one side of the silica coating layer.

13. The electronic device of claim 12, wherein the front stacked structure comprises
an impact absorbing layer disposed between the display panel and the window, and
an impact absorbing layer bonding member that attaches the impact absorbing layer onto the display panel.

14. The electronic device of claim 12, wherein
the display panel comprises an other surface located at a rear of the display panel, and
the display device further comprises a rear stacked structure stacked on the other surface of the display panel,
wherein the rear stacked structure comprises
a polymer layer disposed at the rear of the display panel,
a cushion layer disposed at a rear of the polymer layer,
a plate disposed at a rear of the cushion layer, and
a heat dissipation member disposed at a rear of the plate.

15. The electronic device of claim 12, wherein the base layer comprises at least one of
a polyether block amide-based polymer,
a silicone-based polymer, and
a urethane-based polymer.

16. The electronic device of claim 12, wherein the conductive polymer layer comprises at least one of
a polythiophene-based compound,
a polypyrrole-based compound,
a polyaniline-based compound,
a polyacetylene-based compound, and
a polyphenylenether-based compound.

17. The electronic device of claim 12, wherein a modulus of the soft coating layer is from 500 MPa to 2 GPa.

18. The electronic device of claim 12, wherein
the soft coating layer comprises an additive, and
the additive comprises at least one of
1,6-Hexaneciol diacrylate (HDDA),
1,10-Decanediol diacrylate (DDDA),
bisphenol A (EO)4 diacrylate (BPA(EO)4DA),
bisphenol A (EO)3 diacrylate (BPA(EO)3DA),
bisphenol A (EO)10 diacrylate (BPA(EO)10DA),
bisphenol A (EO)20 diacrylate (BPA(EO)20DA),
bisphenol A (EO)30 diacrylate (BPA(EO)30DA),
tricyclodecane dimethanol diacrylate (TCDDA),
polyethylene glycol 400 diacrylate (PEG400DA),
polyethylene glycol 300 diacrylate (PEG300DA),
polyethylene glycol 200 diacrylate (PEG200DA),
polyethylene glycol 600 diacrylate (PEG600DA),
bisphenol F (EO)4 diacrylate (BPF(EO)4DA), and
polypropylene glycol 400 diacrylate (PPG400DA).

19. The electronic device of claim 12, wherein
the soft coating layer comprises an organic material and an inorganic material, wherein
the organic material comprises at least one of
an acrylate-based compound,
a polyurethane-based compound,
an epoxy-based compound,
a carboxylic acid-based compound, and
a maleimide-based compound, and
the inorganic material comprises at least one of
silicon oxide ($SiO_2$),
zirconium oxide ($ZrO_2$),
aluminum oxide ($Al_2O_3$),
tantalum oxide ($Ta_2O_5$),
niobium oxide ($Nb_2O_5$ or $NbO_2$),
antimony (Sb),
phosphorus (P),
antimony tin oxide (ATO), and
phosphorus tin oxide (PTO), or
the inorganic material is glass bead.

20. The electronic device of claim 12, wherein:
the cover layer includes an organic layer and an organic-inorganic composite layer, and the organic layer includes an acrylate-based compound,
an organic material in the organic-inorganic composite layer includes at least one of an acrylate-based compound, a polyurethane-based compound, an epoxy-based compound, a carboxylic acid-based compound, and a maleimide-based compound, and
an inorganic material in the organic-inorganic composite layer is at least one of silicon oxide ($SiO_2$), zirconium oxide ($ZrO_2$), aluminum oxide ($Al_2O_3$), tantalum oxide ($Ta_2O_5$), and niobium oxide ($Nb_2O_5$ or $NbO_2$), or is a glass bead.

* * * * *